United States Patent
Pham et al.

(10) Patent No.: US 12,259,148 B2
(45) Date of Patent: ***Mar. 25, 2025

(54) COMPUTERIZED HVAC FILTER EVALUATION SYSTEM

(71) Applicant: Copeland LP, Sidney, OH (US)

(72) Inventors: Hung M. Pham, Dayton, OH (US); Stuart K. Morgan, West Chester, OH (US); Brian R. Butler, Centerville, OH (US)

(73) Assignee: Copeland LP, Sidney, OH (US)

( * ) Notice: Subject to any disclaimer, the term of this patent is extended or adjusted under 35 U.S.C. 154(b) by 1092 days.

This patent is subject to a terminal disclaimer.

(21) Appl. No.: 17/048,910

(22) PCT Filed: Apr. 19, 2019

(86) PCT No.: PCT/US2019/028400
§ 371 (c)(1),
(2) Date: Oct. 19, 2020

(87) PCT Pub. No.: WO2019/204786
PCT Pub. Date: Oct. 24, 2019

(65) Prior Publication Data
US 2021/0231331 A1   Jul. 29, 2021

Related U.S. Application Data

(60) Provisional application No. 62/660,903, filed on Apr. 20, 2018.

(51) Int. Cl.
*B01D 46/00*   (2022.01)
*B01D 46/44*   (2006.01)
(Continued)

(52) U.S. Cl.
CPC .......... *F24F 11/39* (2018.01); *B01D 46/0086* (2013.01); *B01D 46/444* (2013.01);
(Continued)

(58) Field of Classification Search
CPC .. B01D 46/0086; B01D 46/46; B01D 46/444; B01D 46/448; B01D 2279/50; F24F 11/38; F24F 11/39; F24F 2110/10
(Continued)

(56) References Cited

U.S. PATENT DOCUMENTS 4,135,370 A   1/1979   Hosoda et al.
4,136,529 A   1/1979   McCarty
(Continued)

FOREIGN PATENT DOCUMENTS

CN   102019120 A   4/2011
CN   102353751 A   2/2012
(Continued)

OTHER PUBLICATIONS

U.S. Appl. No. 17/048,993, filed Oct. 19, 2020, Jeffrey N. Arensmeier.
(Continued)

*Primary Examiner* — Minh Chau T Pham
(74) *Attorney, Agent, or Firm* — Harness, Dickey & Pierce, P.L.C.

(57) ABSTRACT

A heating, ventilation, and air conditioning (HVAC) control system generates a request to replace a first air filter installed in an air handler of an HVAC system with a second air filter. The second air filter has a particulate matter removal efficiency rating that is greater than a particulate matter removal efficiency rating of the first filter. The system delays for a predetermined period of time and then obtains (i) a first temperature of air downstream of the air handler and (ii) a second temperature of air upstream of the air handler. The system then calculates a temperature difference between the
(Continued)

f temperatures and determines whether the temperature difference is within an acceptable range. In response to the temperature difference being within the acceptable range, the system (i) operates the HVAC system using the second air filter and (ii) generates an alert indicating compatibility of the second air filter.

19 Claims, 11 Drawing Sheets

(51) Int. Cl.
*B01D 46/46* (2006.01)
*B01D 46/88* (2022.01)
*F24F 8/10* (2021.01)
*F24F 8/108* (2021.01)
*F24F 11/38* (2018.01)
*F24F 11/39* (2018.01)
*F24F 110/10* (2018.01)

(52) U.S. Cl.
CPC ........... *B01D 46/448* (2013.01); *B01D 46/46* (2013.01); *B01D 46/88* (2022.01); *F24F 8/10* (2021.01); *F24F 8/108* (2021.01); *F24F 11/38* (2018.01); *B01D 2279/50* (2013.01); *F24F 2110/10* (2018.01)

(58) Field of Classification Search
USPC ...................................... 55/DIG. 34; 96/424
See application file for complete search history.

(56) References Cited

U.S. PATENT DOCUMENTS

| | | | |
|---|---|---|---|
| 4,735,054 A | 4/1988 | Beckey | |
| 4,922,808 A | 5/1990 | Smith | |
| 4,977,818 A | 12/1990 | Taylor et al. | |
| 5,067,394 A | 11/1991 | Cavallero | |
| 5,129,234 A | 7/1992 | Alford | |
| 5,259,553 A | 11/1993 | Shyu | |
| 5,267,897 A | 12/1993 | Drees | |
| 5,303,561 A | 4/1994 | Bahel et al. | |
| 5,351,855 A | 10/1994 | Nelson et al. | |
| 5,394,934 A | 3/1995 | Rein et al. | |
| 5,428,964 A | 7/1995 | Lobdell | |
| 5,598,715 A | 2/1997 | Edmisten | |
| 5,707,005 A | 1/1998 | Kettler et al. | |
| 5,832,411 A | 11/1998 | Schatzmann et al. | |
| 5,887,784 A | 3/1999 | Haas | |
| 5,892,690 A | 4/1999 | Boatman et al. | |
| 5,904,896 A | 5/1999 | High | |
| 6,161,764 A | 12/2000 | Jatnieks | |
| 6,187,263 B1 | 2/2001 | Nielsen | |
| 6,230,980 B1 | 5/2001 | Hudson | |
| 6,251,344 B1 | 6/2001 | Goldstein | |
| 6,288,646 B1 | 9/2001 | Skardon | |
| 6,358,374 B1 | 3/2002 | Obee et al. | |
| 6,369,716 B1 | 4/2002 | Abbas et al. | |
| 6,377,858 B1 | 4/2002 | Koeppe | |
| 6,391,102 B1 | 5/2002 | Bodden et al. | |
| 6,392,536 B1 | 5/2002 | Tice et al. | |
| 6,394,427 B1 | 5/2002 | Guetersloh et al. | |
| 6,406,367 B1 | 6/2002 | Chou et al. | |
| 6,406,506 B1 | 6/2002 | Moredock et al. | |
| 6,423,118 B1 | 7/2002 | Becerra et al. | |
| 6,448,896 B1 | 9/2002 | Bankus et al. | |
| 6,466,133 B1 | 10/2002 | Skardon | |
| 6,493,638 B1 | 12/2002 | McLean et al. | |
| 6,494,053 B1 | 12/2002 | Forkosh et al. | |
| 6,494,940 B1 | 12/2002 | Hak | |
| 6,503,462 B1 | 1/2003 | Michalakos et al. | |
| 6,557,365 B2 | 5/2003 | Dinnage et al. | |
| 6,578,770 B1 | 6/2003 | Rosen | |
| 6,582,295 B1 | 6/2003 | Abouchaar | |
| 6,588,250 B2 | 7/2003 | Schell | |
| 6,622,993 B2 | 9/2003 | Mulvaney | |
| 6,691,526 B2 | 2/2004 | Gether et al. | |
| 6,698,219 B2 | 3/2004 | Sekhar et al. | |
| 6,711,470 B1 | 3/2004 | Hartenstein et al. | |
| 6,752,713 B2 | 6/2004 | Johnson, Jr. | |
| 6,790,136 B2 | 9/2004 | Sharp et al. | |
| 6,826,920 B2 | 12/2004 | Wacker | |
| 6,843,068 B1 | 1/2005 | Wacker | |
| 6,848,266 B1 | 2/2005 | Sheehan | |
| 6,884,399 B2 | 4/2005 | Reisfeld et al. | |
| 6,898,960 B1 | 5/2005 | Bodnar | |
| 6,902,592 B2 | 6/2005 | Green et al. | |
| 6,916,239 B2 | 7/2005 | Siddaramanna et al. | |
| 6,919,809 B2 | 7/2005 | Blunn et al. | |
| 6,920,874 B1 | 7/2005 | Siegel | |
| 6,924,326 B2 | 8/2005 | Meyer et al. | |
| 6,926,079 B2 | 8/2005 | Kensok et al. | |
| 6,941,193 B2 | 9/2005 | Frecska et al. | |
| 6,952,715 B1 | 10/2005 | Kronz | |
| 7,016,791 B2 | 3/2006 | Carnegie et al. | |
| 7,048,776 B2 | 5/2006 | Moore et al. | |
| 7,059,400 B2 | 6/2006 | Sekhar et al. | |
| 7,114,343 B2 | 10/2006 | Kates | |
| 7,151,264 B2 | 12/2006 | Ehlers, Sr. | |
| 7,178,350 B2 | 2/2007 | Shah | |
| 7,186,290 B2 | 3/2007 | Sheehan et al. | |
| 7,222,494 B2 | 5/2007 | Peterson et al. | |
| 7,241,326 B2 | 7/2007 | Han et al. | |
| 7,253,743 B2 | 8/2007 | Liang et al. | |
| 7,255,831 B2 | 8/2007 | Wei et al. | |
| 7,261,762 B2 | 8/2007 | Kang et al. | |
| 7,266,960 B2 | 9/2007 | Shah | |
| 7,267,017 B1 | 9/2007 | Bodnar | |
| RE39,871 E | 10/2007 | Skardon | |
| 7,291,206 B1 | 11/2007 | Kiern et al. | |
| 7,291,315 B2 | 11/2007 | Obee et al. | |
| 7,302,313 B2 | 11/2007 | Sharp et al. | |
| 7,306,650 B2 | 12/2007 | Slayzak et al. | |
| 7,325,748 B2 | 2/2008 | Acker, Jr. | |
| 7,326,388 B2 | 2/2008 | Uslenghi et al. | |
| 7,357,828 B2 | 4/2008 | Bohlen | |
| 7,366,588 B2 | 4/2008 | Kim et al. | |
| 7,368,003 B2 | 5/2008 | Crapser et al. | |
| 7,369,955 B2 | 5/2008 | Lee | |
| 7,378,064 B2 | 5/2008 | Uslenghi et al. | |
| 7,381,244 B2 | 6/2008 | Tyndall et al. | |
| 7,389,158 B2 | 6/2008 | Desrochers et al. | |
| 7,398,821 B2 | 7/2008 | Rainer et al. | |
| 7,407,624 B2 | 8/2008 | Cumberland et al. | |
| 7,413,594 B2 | 8/2008 | Paterson et al. | |
| 7,434,413 B2 | 10/2008 | Wruck | |
| 7,475,828 B2 | 1/2009 | Bartlett et al. | |
| 7,552,030 B2 | 6/2009 | Guralnik et al. | |
| 7,552,635 B2 | 6/2009 | Chang et al. | |
| 7,574,871 B2 | 8/2009 | Bloemer et al. | |
| 7,621,985 B1 | 11/2009 | Kuo | |
| 7,632,178 B2 | 12/2009 | Meneely, Jr. | |
| 7,632,340 B2 | 12/2009 | Brady et al. | |
| 7,635,845 B2 | 12/2009 | Jensen et al. | |
| 7,645,323 B2 | 1/2010 | Massenbauer-Strafe et al. | |
| 7,651,256 B2 | 1/2010 | Lee et al. | |
| 7,721,560 B2 | 5/2010 | Carpenter | |
| 7,740,184 B2 | 6/2010 | Schnell et al. | |
| 7,748,639 B2 | 7/2010 | Perry | |
| 7,758,408 B2 | 7/2010 | Hagentoft | |
| 7,765,792 B2 | 8/2010 | Rhodes et al. | |
| 7,780,092 B2 | 8/2010 | Ahmed | |
| 7,789,951 B2 | 9/2010 | Sung et al. | |
| 7,811,363 B2 | 10/2010 | Zhang | |
| 7,836,712 B2 | 11/2010 | Sasao et al. | |
| 7,837,958 B2 | 11/2010 | Crapser et al. | |
| 7,839,275 B2 | 11/2010 | Spalink et al. | |
| 7,857,884 B2 | 12/2010 | Bohlen | |
| 7,857,890 B2 | 12/2010 | Paterson et al. | |
| 7,918,407 B2 | 4/2011 | Patch | |
| 7,932,490 B2 | 4/2011 | Wang et al. | |
| 7,938,896 B2 | 5/2011 | Paterson et al. | |
| 7,951,327 B2 | 5/2011 | Reisfeld et al. | |

(56) References Cited

U.S. PATENT DOCUMENTS

| | | |
|---|---|---|
| 7,966,104 B2 | 6/2011 | Srivastava et al. |
| 7,979,163 B2 | 7/2011 | Terlson et al. |
| 8,024,982 B2 | 9/2011 | Pettit et al. |
| 8,024,986 B2 | 9/2011 | Pettit et al. |
| 8,066,558 B2 | 11/2011 | Thomle et al. |
| 8,079,575 B2 | 12/2011 | Novotny et al. |
| 8,083,398 B2 | 12/2011 | Doll |
| 8,086,407 B2 | 12/2011 | Chan et al. |
| 8,097,067 B2 | 1/2012 | Fox et al. |
| 8,118,236 B2 | 2/2012 | Lestage et al. |
| 8,147,302 B2 | 4/2012 | Desrochers et al. |
| 8,172,154 B1 | 5/2012 | Figley et al. |
| 8,190,367 B2 | 5/2012 | Bassa |
| 8,219,249 B2 | 7/2012 | Harrod et al. |
| 8,231,112 B2 | 7/2012 | Cao et al. |
| 8,231,716 B2 | 7/2012 | Poon |
| 8,239,066 B2 | 8/2012 | Jennings et al. |
| 8,267,164 B2 | 9/2012 | Lestage et al. |
| 8,292,270 B2 | 10/2012 | Terlson et al. |
| 8,318,084 B2 | 11/2012 | Johnson et al. |
| 8,328,910 B2 | 12/2012 | Mulholland |
| 8,333,816 B2 | 12/2012 | Kummer et al. |
| 8,335,593 B2 | 12/2012 | Johnson et al. |
| 8,347,643 B2 | 1/2013 | Taras et al. |
| 8,392,025 B2 | 3/2013 | Orfield |
| 8,397,522 B2 | 3/2013 | Springer et al. |
| 8,398,917 B2 | 3/2013 | Itzhak et al. |
| 8,398,923 B2 | 3/2013 | Mole |
| 8,402,815 B2 | 3/2013 | Marra |
| 8,423,192 B2 | 4/2013 | Liu |
| 8,428,901 B2 | 4/2013 | Hsieh |
| 8,442,694 B2 | 5/2013 | Jang |
| 8,467,977 B2 | 6/2013 | Xia et al. |
| 8,473,429 B2 | 6/2013 | Cheng et al. |
| 8,479,560 B2 | 7/2013 | Cobianu et al. |
| 8,492,722 B2 | 7/2013 | Chang et al. |
| 8,496,514 B2 | 7/2013 | Kim et al. |
| 8,496,735 B2 | 7/2013 | Jones et al. |
| 8,529,830 B2 | 9/2013 | Zhou et al. |
| 8,544,288 B2 | 10/2013 | MacDonald |
| 8,554,375 B2 | 10/2013 | Nerling |
| 8,555,662 B2 | 10/2013 | Peterson et al. |
| 8,560,126 B2 | 10/2013 | Vass et al. |
| 8,567,204 B2 | 10/2013 | Seem |
| 8,574,343 B2 | 11/2013 | Bisson et al. |
| 8,615,327 B2 | 12/2013 | Takagi et al. |
| 8,640,970 B2 | 2/2014 | Dorendorf |
| 8,651,391 B2 | 2/2014 | Patch |
| 8,683,845 B2 | 4/2014 | Fleischer et al. |
| 8,689,572 B2 | 4/2014 | Evans et al. |
| 8,691,144 B2 | 4/2014 | Garfield et al. |
| 8,696,800 B2 | 4/2014 | Storm |
| 8,700,227 B2 | 4/2014 | Vass et al. |
| 8,726,721 B2 | 5/2014 | Minges |
| 8,734,565 B2 | 5/2014 | Hoglund et al. |
| 8,744,629 B2 | 6/2014 | Wallaert et al. |
| 8,755,942 B2 | 6/2014 | Bonilla et al. |
| 8,757,154 B2 | 6/2014 | Schuller |
| 8,758,262 B2 | 6/2014 | Rhee et al. |
| 8,761,945 B2 | 6/2014 | Hadzidedic |
| 8,768,521 B2 | 7/2014 | Amundson et al. |
| 8,797,159 B2 | 8/2014 | Kirkpatrick et al. |
| 8,813,583 B2 | 8/2014 | Kilps et al. |
| 8,838,037 B2 | 9/2014 | Niederberger et al. |
| 8,852,501 B2 | 10/2014 | Hedman |
| 8,860,569 B2 | 10/2014 | Hruska et al. |
| 8,880,224 B2 | 11/2014 | Eaton et al. |
| 8,883,083 B2 | 11/2014 | Law et al. |
| 8,886,785 B2 | 11/2014 | Apte et al. |
| 8,889,079 B2 | 11/2014 | Zahedi |
| 8,892,797 B2 | 11/2014 | Grohman |
| 8,899,055 B2 | 12/2014 | Kuenzel et al. |
| 8,900,518 B2 | 12/2014 | Seck |
| 8,907,803 B2 | 12/2014 | Martin |
| 8,920,537 B2 | 12/2014 | Seike |
| 8,922,971 B2 | 12/2014 | Abate et al. |
| 8,930,030 B2 | 1/2015 | Bester et al. |
| 8,955,761 B2 | 2/2015 | Malloy |
| 8,958,918 B2 | 2/2015 | Voysey |
| 8,961,881 B2 | 2/2015 | Hagh et al. |
| 8,963,728 B2 | 2/2015 | Kates |
| 8,973,845 B2 | 3/2015 | Kanaya et al. |
| 8,978,445 B2 | 3/2015 | Bergsten |
| 8,986,427 B2 | 3/2015 | Hauville et al. |
| 9,010,172 B2 | 4/2015 | Xia et al. |
| 9,019,111 B1 | 4/2015 | Sloo et al. |
| 9,023,304 B2 | 5/2015 | Nikles |
| 9,040,007 B2 | 5/2015 | Hui et al. |
| 9,040,008 B2 | 5/2015 | Zahedi |
| 9,061,230 B2 | 6/2015 | Barakat |
| 9,073,009 B2 | 7/2015 | Vanderspurt et al. |
| 9,078,082 B2 | 7/2015 | Gill et al. |
| 9,080,784 B2 | 7/2015 | Dean-Hendricks et al. |
| 9,091,497 B2 | 7/2015 | Schwendinger et al. |
| 9,092,040 B2 | 7/2015 | Fadell et al. |
| 9,095,636 B2 | 8/2015 | Schmidt et al. |
| 9,097,432 B2 | 8/2015 | Kreft et al. |
| 9,101,904 B2 | 8/2015 | Yates et al. |
| 9,103,557 B2 | 8/2015 | Choi et al. |
| 9,109,981 B2 | 8/2015 | Sharp |
| 9,109,989 B2 | 8/2015 | Hamann et al. |
| 9,121,618 B2 | 9/2015 | Fisher et al. |
| 9,121,837 B2 | 9/2015 | Chan et al. |
| 9,143,344 B2 | 9/2015 | Cho et al. |
| 9,157,647 B2 | 10/2015 | Leen et al. |
| 9,164,519 B2 | 10/2015 | Holloway |
| 9,166,992 B1 | 10/2015 | Stickle et al. |
| 9,175,872 B2 | 11/2015 | McKie et al. |
| 9,182,751 B1 | 11/2015 | Reeder |
| 9,186,609 B2 | 11/2015 | Sherman, III et al. |
| 9,200,804 B2 | 12/2015 | Park et al. |
| 9,208,676 B2 | 12/2015 | Fadell et al. |
| 9,234,667 B2 | 1/2016 | Ito et al. |
| 9,250,633 B2 | 2/2016 | Chen et al. |
| 9,254,459 B2 | 2/2016 | Miller |
| 9,261,290 B2 | 2/2016 | Storm |
| 9,278,304 B2 | 3/2016 | Lee |
| 9,280,884 B1 | 3/2016 | Schultz et al. |
| 9,286,779 B2 | 3/2016 | Shaw et al. |
| 9,304,511 B2 | 4/2016 | Blount et al. |
| 9,304,521 B2 | 4/2016 | Kates |
| 9,308,492 B2 | 4/2016 | Obee et al. |
| 9,310,088 B2 | 4/2016 | Melikov et al. |
| 9,311,807 B2 | 4/2016 | Schultz et al. |
| 9,316,410 B2 | 4/2016 | Meirav et al. |
| 9,317,659 B2 | 4/2016 | Balinski et al. |
| 9,323,895 B2 | 4/2016 | Balinski et al. |
| 9,325,516 B2 | 4/2016 | Pera et al. |
| 9,328,936 B2 | 5/2016 | Meirav et al. |
| 9,332,322 B2 | 5/2016 | Niemeyer et al. |
| 9,344,753 B2 | 5/2016 | Yerli |
| 9,347,678 B2 | 5/2016 | Stakutis et al. |
| 9,347,860 B1 | 5/2016 | Lalain et al. |
| 9,347,925 B2 | 5/2016 | Shen et al. |
| 9,353,964 B2 | 5/2016 | Kates |
| 9,353,966 B2 | 5/2016 | Finkam |
| 9,360,229 B2 | 6/2016 | Modi et al. |
| 9,366,448 B2 | 6/2016 | Dean-Hendricks et al. |
| 9,372,010 B2 | 6/2016 | Jung et al. |
| 9,375,672 B2 | 6/2016 | Meirav et al. |
| 9,377,768 B2 | 6/2016 | Grohman |
| 9,390,388 B2 | 7/2016 | Drees et al. |
| 9,395,096 B2 | 7/2016 | Fisher et al. |
| 9,399,187 B2 | 7/2016 | Meirav et al. |
| 9,400,119 B2 | 7/2016 | Malloy |
| 9,404,666 B2 | 8/2016 | Terlson et al. |
| 9,405,301 B2 | 8/2016 | Montero et al. |
| 9,410,752 B2 | 8/2016 | Wallace |
| 9,416,987 B2 | 8/2016 | Ragland et al. |
| 9,417,005 B1 | 8/2016 | Roth et al. |
| 9,417,637 B2 | 8/2016 | Matsuoka et al. |
| 9,423,144 B2 | 8/2016 | Evans et al. |
| 9,423,146 B2 | 8/2016 | Bruce et al. |
| 9,427,728 B2 | 8/2016 | Sidheswaran et al. |

(56) References Cited

U.S. PATENT DOCUMENTS

| | | |
|---|---|---|
| 9,449,491 B2 | 9/2016 | Sager et al. |
| 9,459,606 B2 | 10/2016 | Takayama et al. |
| 9,463,339 B2 | 10/2016 | Nozaki |
| 9,464,818 B2 | 10/2016 | Holm et al. |
| 9,498,555 B2 | 11/2016 | Hingorani et al. |
| 9,520,250 B2 | 12/2016 | O'Keeffe |
| 9,522,210 B2 | 12/2016 | Worrilow |
| 9,523,665 B2 | 12/2016 | Fleischer et al. |
| 9,535,407 B2 | 1/2017 | Durham et al. |
| 9,537,670 B2 | 1/2017 | Cho et al. |
| 9,557,069 B2 | 1/2017 | Matsui et al. |
| 9,568,445 B2 | 2/2017 | Klein et al. |
| 9,593,859 B2 | 3/2017 | Niazi |
| 9,593,861 B1 | 3/2017 | Burnett |
| 9,597,627 B2 | 3/2017 | Zhang |
| 9,599,353 B2 | 3/2017 | Cur et al. |
| 9,599,357 B2 | 3/2017 | Vogel |
| 9,612,188 B2 | 4/2017 | Johnston et al. |
| 9,618,224 B2 | 4/2017 | Emmons et al. |
| 9,638,434 B2 | 5/2017 | Alston |
| 9,638,436 B2 | 5/2017 | Arensmeier et al. |
| 9,643,117 B2 | 5/2017 | Rahlin et al. |
| 9,645,112 B2 | 5/2017 | Char |
| 9,677,777 B2 | 6/2017 | Karamanos et al. |
| 9,694,309 B2 | 7/2017 | Weatherman et al. |
| 9,696,049 B2 | 7/2017 | Metteer |
| 9,696,735 B2 | 7/2017 | Matsuoka et al. |
| 9,709,291 B2 | 7/2017 | Dostmann |
| 9,714,844 B1 | 7/2017 | Stamatakis et al. |
| 9,715,242 B2 | 7/2017 | Pillai et al. |
| 9,723,380 B2 | 8/2017 | Patel et al. |
| 9,726,579 B2 | 8/2017 | Han et al. |
| 9,729,945 B2 | 8/2017 | Schultz et al. |
| 9,737,842 B2 | 8/2017 | Matlin et al. |
| 9,752,789 B2 | 9/2017 | Staniforth et al. |
| 9,759,437 B2 | 9/2017 | Kim et al. |
| 9,764,623 B2 | 9/2017 | Fruehsorger et al. |
| 9,789,436 B2 | 10/2017 | Meirav et al. |
| 9,797,620 B2 | 10/2017 | Matsugi et al. |
| 9,797,812 B2 | 10/2017 | Hamann et al. |
| 9,803,877 B2 | 10/2017 | Yun |
| 9,810,441 B2 | 11/2017 | Dean-Hendricks et al. |
| 9,816,724 B2 | 11/2017 | Phannavong et al. |
| 9,821,260 B2 | 11/2017 | Stoner, Jr. et al. |
| 9,833,734 B2 | 12/2017 | Fox et al. |
| 9,835,348 B2 | 12/2017 | Storm et al. |
| 9,839,872 B2 | 12/2017 | Spartz |
| 9,851,299 B2 | 12/2017 | Bertaux |
| 9,854,335 B2 | 12/2017 | Patel et al. |
| 9,856,883 B1 | 1/2018 | Olsen |
| 9,857,301 B1 | 1/2018 | Nourbakhsh et al. |
| 9,890,969 B2 | 2/2018 | Martin |
| 9,986,313 B2 | 5/2018 | Schwarzkopf et al. |
| 9,990,842 B2 | 6/2018 | Zribi et al. |
| 10,976,065 B2 | 4/2021 | Kohn et al. |
| 11,371,726 B2 * | 6/2022 | Pham .................. F24F 3/16 |
| 11,543,147 B1 * | 1/2023 | Rite .................. F24F 11/49 |
| 2001/0045159 A1 | 11/2001 | Johnson et al. |
| 2003/0070544 A1 | 4/2003 | Mulvaney et al. |
| 2004/0006886 A1 * | 1/2004 | Lee .................. D06F 58/22 |
| | | 34/82 |
| 2004/0109800 A1 | 6/2004 | Pahlman et al. |
| 2005/0098495 A1 | 5/2005 | Hughes |
| 2005/0277381 A1 | 12/2005 | Banerjee et al. |
| 2006/0055547 A1 | 3/2006 | DiMaggio |
| 2006/0267756 A1 | 11/2006 | Kates |
| 2007/0013534 A1 | 1/2007 | DiMaggio |
| 2007/0082601 A1 | 4/2007 | Desrochers et al. |
| 2007/0155305 A1 | 7/2007 | Heidel et al. |
| 2008/0014857 A1 | 1/2008 | Spadafora et al. |
| 2008/0022705 A1 | 1/2008 | Clearman |
| 2008/0182506 A1 | 7/2008 | Jackson et al. |
| 2009/0079098 A1 | 3/2009 | Ezra |
| 2009/0126382 A1 | 5/2009 | Rubino et al. |
| 2009/0179338 A1 | 7/2009 | Cottier |
| 2009/0204262 A1 | 8/2009 | Nishimura |
| 2011/0010071 A1 | 1/2011 | Rhodes et al. |
| 2011/0052453 A1 | 3/2011 | McLarnon et al. |
| 2011/0125044 A1 | 5/2011 | Rhee et al. |
| 2011/0151766 A1 | 6/2011 | Sherman et al. |
| 2011/0184250 A1 | 7/2011 | Schmidt et al. |
| 2012/0095684 A1 | 4/2012 | Chan et al. |
| 2012/0323374 A1 | 12/2012 | Dean-Hendricks et al. |
| 2013/0014522 A1 | 1/2013 | Lukasse et al. |
| 2013/0144527 A1 | 6/2013 | Kuhnreichi |
| 2013/0226352 A1 | 8/2013 | Dean-Hendricks et al. |
| 2013/0287626 A1 | 10/2013 | Benedek et al. |
| 2013/0289778 A1 | 10/2013 | Ishizaka |
| 2013/0323781 A1 | 12/2013 | Moularat et al. |
| 2013/0344609 A1 | 12/2013 | Mayer et al. |
| 2014/0020559 A1 | 1/2014 | Meirav et al. |
| 2014/0053586 A1 | 2/2014 | Poecher et al. |
| 2014/0079564 A1 | 3/2014 | Becerra et al. |
| 2014/0083292 A1 | 3/2014 | Weiden |
| 2014/0109649 A1 | 4/2014 | Fleischer et al. |
| 2014/0129004 A1 | 5/2014 | Takayama et al. |
| 2014/0139342 A1 | 5/2014 | Brown |
| 2014/0190679 A1 | 7/2014 | Roosli et al. |
| 2014/0207693 A1 | 7/2014 | Horst et al. |
| 2014/0217185 A1 | 8/2014 | Bicknell |
| 2014/0241970 A1 | 8/2014 | Smyrniotis et al. |
| 2014/0244043 A1 | 8/2014 | Foster |
| 2014/0262837 A1 | 9/2014 | Sidheswaran et al. |
| 2014/0266755 A1 | 9/2014 | Arensmeier et al. |
| 2014/0313048 A1 | 10/2014 | Sabata et al. |
| 2014/0346237 A1 | 11/2014 | Mirza et al. |
| 2014/0354976 A1 | 12/2014 | Evenstad et al. |
| 2014/0365017 A1 | 12/2014 | Hanna et al. |
| 2014/0370800 A1 | 12/2014 | Ansari |
| 2015/0011154 A1 | 1/2015 | Holm et al. |
| 2015/0032264 A1 | 1/2015 | Emmons et al. |
| 2015/0046179 A1 | 2/2015 | Kang |
| 2015/0050876 A1 | 2/2015 | Sakai et al. |
| 2015/0052975 A1 | 2/2015 | Martin |
| 2015/0077737 A1 | 3/2015 | Belinsky et al. |
| 2015/0088786 A1 | 3/2015 | Anandhakrishnan |
| 2015/0140919 A1 | 5/2015 | Zwijack |
| 2015/0153061 A1 | 6/2015 | Riberon et al. |
| 2015/0153317 A1 | 6/2015 | Krebs |
| 2015/0168003 A1 | 6/2015 | Stefanski et al. |
| 2015/0168964 A1 | 6/2015 | Wu et al. |
| 2015/0202563 A1 | 7/2015 | Spartz |
| 2015/0241318 A1 | 8/2015 | Hamann et al. |
| 2015/0246150 A1 | 9/2015 | De Koster et al. |
| 2015/0256355 A1 | 9/2015 | Pera et al. |
| 2015/0285524 A1 | 10/2015 | Saunders |
| 2015/0285755 A1 | 10/2015 | Moss et al. |
| 2015/0289802 A1 | 10/2015 | Thomas et al. |
| 2015/0298043 A1 | 10/2015 | Meirav et al. |
| 2015/0301513 A1 | 10/2015 | Sager et al. |
| 2015/0306271 A1 | 10/2015 | Willette |
| 2015/0323206 A1 | 11/2015 | Chan et al. |
| 2015/0323427 A1 | 11/2015 | Sharp |
| 2015/0330650 A1 | 11/2015 | Abiprojo et al. |
| 2015/0330817 A1 | 11/2015 | Law et al. |
| 2015/0330861 A1 * | 11/2015 | Alsaleem .................. F24F 11/49 |
| | | 702/183 |
| 2015/0335834 A1 | 11/2015 | Anandhakrishnan |
| 2015/0347910 A1 | 12/2015 | Fadell et al. |
| 2015/0348400 A1 | 12/2015 | Zribi et al. |
| 2015/0354848 A1 | 12/2015 | Abel et al. |
| 2015/0369503 A1 | 12/2015 | Flaherty et al. |
| 2015/0369507 A1 | 12/2015 | Flaherty et al. |
| 2015/0370986 A1 | 12/2015 | Hayward |
| 2015/0375187 A1 | 12/2015 | Yates et al. |
| 2016/0015277 A1 | 1/2016 | Dumoulin et al. |
| 2016/0015278 A1 | 1/2016 | Campo et al. |
| 2016/0015314 A1 | 1/2016 | Dusanter et al. |
| 2016/0015315 A1 | 1/2016 | Auphan et al. |
| 2016/0026201 A1 | 1/2016 | Vellanki et al. |
| 2016/0029805 A1 | 2/2016 | Arens et al. |
| 2016/0041074 A1 | 2/2016 | Pliskin |
| 2016/0048143 A1 | 2/2016 | Chan et al. |
| 2016/0054023 A1 | 2/2016 | Baker et al. |

(56) References Cited

U.S. PATENT DOCUMENTS

| | | |
|---|---|---|
| 2016/0061472 A1 | 3/2016 | Lee et al. |
| 2016/0061794 A1 | 3/2016 | Schultz et al. |
| 2016/0078751 A1 | 3/2016 | Sloo et al. |
| 2016/0088438 A1 | 3/2016 | O'Keeffe |
| 2016/0089089 A1 | 3/2016 | Kakkar et al. |
| 2016/0091216 A1 | 3/2016 | Tran et al. |
| 2016/0107114 A1 | 4/2016 | Fu et al. |
| 2016/0110782 A1 | 4/2016 | Tadajewski |
| 2016/0116181 A1 | 4/2016 | Aultman et al. |
| 2016/0125714 A1 | 5/2016 | Kates et al. |
| 2016/0132031 A1 | 5/2016 | Kozura et al. |
| 2016/0133108 A1 | 5/2016 | Bucsa et al. |
| 2016/0139038 A1 | 5/2016 | Oldsen et al. |
| 2016/0147506 A1 | 5/2016 | Britt et al. |
| 2016/0153674 A1 | 6/2016 | Lancaster |
| 2016/0153884 A1 | 6/2016 | Han et al. |
| 2016/0161137 A1 | 6/2016 | Chen et al. |
| 2016/0169544 A1 | 6/2016 | Fischer et al. |
| 2016/0169545 A1 | 6/2016 | Mangsuli et al. |
| 2016/0178586 A1 | 6/2016 | Stark |
| 2016/0209065 A1 | 7/2016 | Hagstrom et al. |
| 2016/0209070 A1 | 7/2016 | Hrejsa et al. |
| 2016/0209316 A1 | 7/2016 | Buseyne et al. |
| 2016/0228809 A1 | 8/2016 | Meirav et al. |
| 2016/0228811 A1 | 8/2016 | Meirav et al. |
| 2016/0231014 A1 | 8/2016 | Ro et al. |
| 2016/0238527 A1 | 8/2016 | Tseng et al. |
| 2016/0245784 A1 | 8/2016 | Matocha et al. |
| 2016/0256590 A1 | 9/2016 | Taghipour |
| 2016/0263263 A1 | 9/2016 | Robert |
| 2016/0263268 A1 | 9/2016 | Kirschman |
| 2016/0292781 A1 | 10/2016 | Nahmad et al. |
| 2016/0313290 A1 | 10/2016 | Forzani et al. |
| 2016/0332170 A1 | 11/2016 | Wennerstrom |
| 2016/0334121 A1 | 11/2016 | Oobayashi |
| 2016/0348938 A1 | 12/2016 | Simon et al. |
| 2016/0356511 A1 | 12/2016 | Messinger et al. |
| 2016/0363332 A1 | 12/2016 | Blackley |
| 2016/0363339 A1 | 12/2016 | Blackley |
| 2016/0370021 A1 | 12/2016 | Wiley et al. |
| 2016/0370029 A1 | 12/2016 | Kurelowech |
| 2016/0377305 A1 | 12/2016 | Kwa |
| 2017/0007954 A1 | 1/2017 | Ehdaie |
| 2017/0010006 A1 | 1/2017 | Kim et al. |
| 2017/0021298 A1 | 1/2017 | Williams et al. |
| 2017/0080373 A1 | 3/2017 | Engelhard |
| 2017/0089810 A1 | 3/2017 | Novaro |
| 2017/0095762 A1 | 4/2017 | Wolowicz |
| 2017/0097165 A1 | 4/2017 | Yasuda et al. |
| 2017/0098230 A1 | 4/2017 | Orangkhadivi |
| 2017/0108231 A1 | 4/2017 | Hasegawa et al. |
| 2017/0130981 A1 | 5/2017 | Willette et al. |
| 2017/0159964 A1 | 6/2017 | Arai et al. |
| 2017/0167743 A1 | 6/2017 | Dempsey et al. |
| 2017/0189844 A1 | 7/2017 | McLeod et al. |
| 2017/0193788 A1 | 7/2017 | Kim et al. |
| 2017/0193792 A1 | 7/2017 | Bermudez Rodriguez et al. |
| 2017/0234570 A1 | 8/2017 | Livchak et al. |
| 2017/0248332 A1 | 8/2017 | Wright et al. |
| 2017/0268797 A1 | 9/2017 | Mowris et al. |
| 2017/0273256 A1 | 9/2017 | Hutzel |
| 2017/0273845 A1 | 9/2017 | Phillips et al. |
| 2017/0292432 A1 | 10/2017 | Hall et al. |
| 2017/0314812 A1 | 11/2017 | Hurley |
| 2017/0323550 A1 | 11/2017 | Patil et al. |
| 2017/0328591 A1 | 11/2017 | Kelly et al. |
| 2017/0333838 A1 | 11/2017 | Bender et al. |
| 2017/0341001 A1 | 11/2017 | Jousma et al. |
| 2017/0341002 A1 | 11/2017 | Cama et al. |
| 2017/0343227 A1 | 11/2017 | Mowris |
| 2017/0347499 A1 | 11/2017 | Ross et al. |
| 2017/0350610 A1 | 12/2017 | Michielsen et al. |
| 2017/0350611 A1 | 12/2017 | Su et al. |
| 2017/0356670 A1 * | 12/2017 | Zhang ............... F24F 11/77 |
| 2017/0368488 A1 | 12/2017 | Wall |
| 2018/0001249 A1 | 1/2018 | Sher |
| 2018/0017275 A1 | 1/2018 | Merrill |
| 2018/0017278 A1 | 1/2018 | Klein et al. |
| 2018/0017513 A1 | 1/2018 | Le Neel et al. |
| 2018/0017536 A1 | 1/2018 | Le Neel et al. |
| 2018/0021613 A1 | 1/2018 | Li |
| 2018/0023831 A1 | 1/2018 | Ha et al. |
| 2018/0023834 A1 | 1/2018 | Hatch et al. |
| 2018/0050302 A1 | 2/2018 | Kamiyama et al. |
| 2018/0073759 A1 | 3/2018 | Zhang et al. |
| 2018/0119974 A1 | 5/2018 | Kotake et al. |
| 2018/0135877 A1 | 5/2018 | Seiler |
| 2018/0148180 A1 | 5/2018 | Fagundes et al. |
| 2019/0023099 A1 | 1/2019 | Li et al. |
| 2021/0041119 A1 | 2/2021 | Pham et al. |
| 2023/0070313 A1 | 3/2023 | Douglas et al. |

FOREIGN PATENT DOCUMENTS

| | | |
|---|---|---|
| CN | 102393882 A | 3/2012 |
| CN | 202792383 U | 3/2013 |
| CN | 203090662 U | 7/2013 |
| CN | 104089361 A | 10/2014 |
| CN | 203949322 U | 11/2014 |
| CN | 104359815 A | 2/2015 |
| CN | 104534617 A | 4/2015 |
| CN | 103958976 B | 11/2016 |
| CN | 106196506 A | 12/2016 |
| CN | 107676931 A | 2/2018 |
| CN | 107940682 A | 4/2018 |
| DE | 10108274 A1 | 9/2002 |
| EP | 0893657 A1 | 1/1999 |
| EP | 1402935 A1 | 3/2004 |
| EP | 1904905 A2 | 4/2008 |
| EP | 2450640 A2 | 5/2012 |
| EP | 2134556 B1 | 7/2012 |
| EP | 2368616 B1 | 12/2012 |
| EP | 2564114 A1 | 3/2013 |
| EP | 2713159 A2 | 4/2014 |
| EP | 2891019 A1 | 7/2015 |
| EP | 2937961 A1 | 10/2015 |
| EP | 3040948 A1 | 7/2016 |
| EP | 3073883 A1 | 10/2016 |
| EP | 3121524 A1 | 1/2017 |
| JP | H05180487 A | 7/1993 |
| JP | 09-280640 | 10/1997 |
| JP | H09-280640 A | 10/1997 |
| JP | 2007083106 A | 4/2007 |
| JP | 5231476 B2 | 7/2013 |
| JP | 2014208343 A | 11/2014 |
| JP | 2015152175 A | 8/2015 |
| KR | 100355352 B1 | 9/2002 |
| KR | 20030016787 A | 3/2003 |
| KR | 20040061677 A | 7/2004 |
| KR | 100509332 B1 | 8/2005 |
| KR | 20050120911 A | 12/2005 |
| KR | 20070072787 A | 7/2007 |
| KR | 100819077 B1 | 4/2008 |
| KR | 100930346 B1 | 12/2009 |
| KR | 20100089605 A | 8/2010 |
| KR | 20110074222 A | 6/2011 |
| KR | 20110093329 A | 8/2011 |
| KR | 101199180 B1 | 11/2012 |
| KR | 101566592 B1 | 11/2015 |
| KR | 101765454 B1 | 8/2017 |
| KR | 101771053 B1 | 8/2017 |
| KR | 20170122043 A | 11/2017 |
| KR | 20180007381 A | 1/2018 |
| LU | 92350 A1 | 7/2015 |
| WO | WO-9409324 A1 | 4/1994 |
| WO | WO-2005110580 A2 | 11/2005 |
| WO | WO-2013163612 A1 | 10/2013 |
| WO | WO-2015078672 A1 | 6/2015 |
| WO | WO-2016102337 A1 | 6/2016 |

(56) References Cited

FOREIGN PATENT DOCUMENTS

| WO | WO-2016139544 A1 | 9/2016 |
|---|---|---|
| WO | WO-2017146637 A1 | 8/2017 |

OTHER PUBLICATIONS

U.S. Appl. No. 17/078,031, filed Oct. 22, 2020, Stuart K. Morgan.
U.S. Appl. No. 17/048,993, filed Oct. 19, 202, Jeffrey N. Arensmeier.
U.S. Appl. No. 17/048,866, filed Oct. 19, 2020, Hung M. Pham.
Notice of Allowance regarding U.S. Appl. No. 17/048,993 dated Oct. 19, 2020.
"Clean Your Air with Keen Home Smart Filters", Keen Home, Inc., <https://keenhome.io/pages/smart-filter> 2018.
"Home Comfort: Digital, App-Based Climate Control", Ecovent Systems Inc., <https://www.ecoventsystems.com/> 2018.
"Meet the Keen Home Zoning System—How It Works", Keen Home, Inc., <https://keenhome.io/pages/how-it-works> 2018.
Doty, Steve, et al., "Building Operations: Balancing Energy Efficiency with Indoor Air Quality", 2009.
El Mankibi, Mohamed, "Indoor air quality control in case of scheduled or intermittent occupancy based building: Development of a scale model", 2009.
Emmerich, Steven, et al., "Indoor air quality impacts of residential HVAC systems, phase 1 report: Computer simulation plan", NISTIR 5346: Building and Fire Research Laboratory; National Institute of Standards and Technology: http://www.researchgate.net/profile/Steven_Emmerich/publication/236454476_Indoor_air_quality_impacts_of_residential_HVAC_systems_phase_1_report_Computer_simulation_plan/links/565f5f2308ae1ef929854780.pdf; Feb. 1994; 108 Pages.
Footbot; Product Specifications; www.footbot.io. Accessed Sep. 13, 2017.
Herberger, Simone, et al., "Indoor Air Quality Monitoring Improving Air Quality Perception", 2012.
International Search Report of the ISA/KR regarding International Application No. PCT/US2018/062190 dated Mar. 21, 2019.
Shaw, C. Y., "Maintaining acceptable air quality in office buildings through ventilation", Construction Technology Updated No. 3, Institute for Research in Construction, National Research Council of Canada, Jan. 1997; 4 Pages.
Turner, William J.N., et al., "Energy and IAQ implications of residential ventilation cooling", ResearchGate: http://www.researchgate.net/profile/William_Turner10/publication/278961832_Energy_and_IAQ_implications_of_residential_ventilation_cooling/links/5587e12608aef58c03a06547.pdf, Aug. 2014; 52 pages.
Written Opinion of the ISA/KR regarding International Application No. PCT/US2018/062190 dated Mar. 21, 2019.
Zhong, Lexuan, et al., "Ozonation Air Purification Technology in HVAC Applications", Concordia University: http://www.researchgate.net/profile/Lexuan_Zhong/publication/260363850_Ozonation_Air_Purification_Technology_in_HVAC_Applications/links/0a85e530e28d98ecf4000000, 2014; 8 Pages.
Non-Final Office Action regarding U.S. Appl. No. 17/078,031 dated Oct. 20, 2021.
Notice of Allowance regarding U.S. Appl. No. 17/078,031 dated Feb. 22, 2022.
Non-Final Office Action for U.S. Appl. No. 17/048,993 dated Aug. 21, 2023.
Non-Final Office Action for U.S. Appl. No. 17/048,866 dated Jul. 20, 2023.
International Search Report of the ISA/KR regarding International Application No. PCT/US2019/028409 dated Aug. 9, 2019.
Written Opinion of the ISA/KR regarding International Application No. PCT/US2019/028409 dated Aug. 9, 2019.
International Search Report of the ISA/KR regarding International Application No. PCT/US2019/028400 dated Aug. 9, 2019.
Written Opinion of the ISA/KR regarding International Application No. PCT/US2019/028400 dated Aug. 9, 2019.
International Search Report of the ISA/KR regarding International Application No. PCT/US2019/028398 dated Aug. 6, 2019.
Written Opinion of the ISA/KR regarding International Application No. PCT/US2019/028398 dated Aug. 6, 2019.

* cited by examiner

COMPUTERIZED HVAC FILTER EVALUATION SYSTEM

CROSS-REFERENCE TO RELATED APPLICATIONS

This application is the U.S. National Phase Application under 35 U.S.C. 371 of International Application No. PCT/US2019/028400, filed Apr. 19, 2019, which claims the benefit of U.S. Provisional Application No. 62/660,903, filed Apr. 20, 2018. The entire disclosures of the application referenced above are incorporated herein by reference.

FIELD

The present disclosure relates to environmental control systems and more particularly to computerized control of environmental control systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential or light commercial HVAC (heating, ventilation, and air conditioning) system controls temperature and humidity of a building. Upper and lower temperature limits may be specified by an occupant or owner of the building, such as an employee working in the building or a homeowner. A thermostat controls operation of the HVAC system based on a comparison of measured air temperature and a target value. The thermostat controls the HVAC system to heat the building when the temperature is less than the lower temperature limit. The thermostat controls the HVAC system to cool the building when the temperature is greater than the upper temperature limit. Heating and cooling the building generally decreases humidity, although the HVAC system may include a humidifier that adds humidity to warm air output by the HVAC system during heating of the building.

SUMMARY

A heating, ventilation, and air conditioning (HVAC) control system is disclosed. The system includes a processor and a computer-readable medium that includes instructions executable by the processor. The instructions include selectively generating a replacement request for an operator to replace a first air filter installed in an air handler of an HVAC system with a second air filter. The first air filter has a first particulate matter removal efficiency rating and the second air filter has a second particulate matter removal efficiency rating that is greater than the first particulate matter removal efficiency rating. The instructions further include delaying, in response to activation of the HVAC system following installation of the second air filter, for a first predetermined period of time and then obtaining (i) a first temperature that represents a temperature of air downstream of the air handler and (ii) a second temperature that represents a temperature of air upstream of the air handler. The instructions also include calculating a first temperature difference between the first temperature and the second temperature; determining whether the first temperature difference is within an acceptable range; and in response to the first temperature difference being within the acceptable range, (i) operating the HVAC system using the second air filter and (ii) generating an alert indicating compatibility of the second air filter with the HVAC system.

In other features, the instructions further include, while the first air filter is installed, delaying for a second predetermined period of time following HVAC activation and then obtaining (i) a third temperature that represents a temperature of air downstream of the air handler and (ii) a fourth temperature that represents a temperature of air upstream of the air handler. The instructions also include calculating a second temperature difference between the third temperature and the fourth temperature and determining whether the second temperature difference is within the acceptable range. The instructions further include, in response to determining that the second temperature difference is outside of the acceptable range, preventing generation of the replacement request.

In yet other features, the instructions further include the instructions further include selecting between and performing one of (i) designating an existing air filter installed in the HVAC system as the first air filter and (ii) generating an initial request to replace the existing air filter with the first air filter.

In other features, the instructions further include, while the first air filter is installed, obtaining a first current value indicating current consumed by a circulator blower of the HVAC system and determining a threshold based on the first current value. The instructions include, in response to activation of the HVAC system following installation of the second air filter, obtaining a second current value indicating current consumed by the circulator blower and in response to the second current value being greater than the threshold, generating an alert indicating incompatibility of the second air filter with the HVAC system.

In further features, the instructions further include, obtaining, in response to activation of the HVAC system following installation of the second air filter, a current value indicating current consumed by a circulator blower of the HVAC system. The instructions include, in response to the current value being greater than a threshold, generating an alert indicating incompatibility of the second air filter with the HVAC system.

In other features, the instructions further include determining an acceptable range of airflow for the HVAC system. The instructions include, in response to activation of the HVAC system following installation of the second air filter, obtaining an airflow value indicating airflow through ductwork of the HVAC system. The instructions also include, in response to the airflow value being outside of the acceptable range of airflow, generating an alert indicating incompatibility of the second air filter with the HVAC system.

In other features, the instructions further include disabling, in response to determining that the first temperature difference is outside of the acceptable range, operation of the HVAC system pending replacement of the second air filter.

In yet other features, the instructions further include, in response to determining that the first temperature difference is outside of the acceptable range, calculating a change per rating based on the first particulate matter removal efficiency rating, the second particulate matter removal efficiency rating, the first temperature difference, and, in some implementations, the second temperature difference. The instructions include determining a highest suitable particulate matter removal efficiency rating for the HVAC system based on the change per rating. The instructions also include generating an indication of the highest suitable particulate matter removal efficiency rating for the HVAC system.

In other features, the system further includes a first sensor module located at a supply vent of the HVAC system. The first sensor module is configured to measure the first temperature. In other features, the second temperature is obtained from a thermostat.

In other features, the system further includes a second sensor module located at a return vent of the HVAC system. The second sensor module is configured to measure the second temperature. In yet other features, the system includes a third sensor module located within a conditioned space of the HVAC system. The third sensor module is configured to measure the second temperature.

In further features, the instructions further include generating, in response to installation of the second air filter, a request for the operator to activate the HVAC system.

In other features, the instructions further include determining, in response to installation of the second air filter, whether the HVAC system is set to a heating mode. The instructions also include, in response to the HVAC system including a heat pump and being set to the heating mode, generating a request for the operator to activate backup electric heat.

In other features, the first particulate matter removal efficiency rating and the second particulate matter removal efficiency rating are minimum efficiency reporting value (MERV) ratings.

In yet other features, the instructions further include, in response to the first temperature difference being within the acceptable range, delaying for a second predetermined period of time and then obtaining (i) a third temperature that represents a temperature of air downstream of the air handler and (ii) a fourth temperature that represents a temperature of air upstream of the air handler. The instructions further include calculating a second temperature difference between the third temperature and the fourth temperature and determining whether the second temperature difference is within the acceptable range. The instructions include, in response to the second temperature difference being within the acceptable range, continue operating the HVAC system using the second air filter.

A method for controlling a heating, ventilation, and air conditioning (HVAC) control system is disclosed. The method includes selectively generating a replacement request for an operator to replace a first air filter installed in an air handler of an HVAC system with a second air filter. The first air filter has a first particulate matter removal efficiency rating and the second air filter has a second particulate matter removal efficiency rating that is greater than the first particulate matter removal efficiency rating. The method further includes in response to activation of the HVAC system following installation of the second air filter, delaying for a first predetermined period of time and then obtaining (i) a first temperature that represents a temperature of air downstream of the air handler and (ii) a second temperature that represents a temperature of air upstream of the air handler. The method also includes calculating a first temperature difference between the first temperature and the second temperature, determining whether the first temperature difference is within an acceptable range, and in response to the first temperature difference being within the acceptable range, (i) operating the HVAC system using the second air filter and (ii) generating an alert indicating compatibility of the second air filter with the HVAC system.

In other features, the method includes, while the first air filter is installed, delaying for a second predetermined period of time following HVAC activation and then obtaining (i) a third temperature that represents a temperature of air downstream of the air handler and (ii) a fourth temperature that represents a temperature of air upstream of the air handler. The method further includes calculating a second temperature difference between the third temperature and the fourth temperature, determining whether the second temperature difference is within the acceptable range, and in response to determining that the second temperature difference is outside of the acceptable range, preventing generation of the replacement request.

In further features, the method includes selecting between and performing one of (i) designating an existing air filter installed in the HVAC system as the first air filter and (ii) generating an initial request to replace the existing air filter with the first air filter.

In other features, the method includes, while the first air filter is installed, obtaining a first current value indicating current consumed by a circulator blower of the HVAC system and determining a threshold based on the first current value. The method further includes, in response to activation of the HVAC system following installation of the second air filter, obtaining a second current value indicating current consumed by the circulator blower and in response to the second current value being greater than the threshold, generating an alert indicating incompatibility of the second air filter with the HVAC system.

In other features, the method includes, in response to activation of the HVAC system following installation of the second air filter, obtaining a current value indicating current consumed by a circulator blower of the HVAC system. The method also includes, in response to the current value being greater than a threshold, generating an alert indicating incompatibility of the second air filter with the HVAC system.

In yet other features, the method includes determining an acceptable range of airflow for the HVAC system and obtaining, in response to activation of the HVAC system following installation of the second air filter, an airflow value indicating airflow through ductwork of the HVAC system. The method also includes generating, in response to the airflow value being outside of the acceptable range of airflow, an alert indicating incompatibility of the second air filter with the HVAC system.

In other features, the method includes disabling, in response to determining that the first temperature difference is outside of the acceptable range, operation of the HVAC system pending replacement of the second air filter.

In further features, the method includes, in response to determining that the first temperature difference is outside of the acceptable range, calculating a change per rating based on the first particulate matter removal efficiency rating, the second particulate matter removal efficiency rating, the first temperature difference, and, in some implementations, the second temperature difference. The method also includes determining a highest suitable particulate matter removal efficiency rating for the HVAC system based on the change per rating and generating an indication of the highest suitable particulate matter removal efficiency rating for the HVAC system.

In other features, obtaining the first temperature includes receiving a temperature measured by a first sensor module located at a supply vent of the HVAC system.

In other features, obtaining the second temperature includes receiving a temperature measured by a thermostat. In yet other features, obtaining the second temperature includes receiving a temperature measured by a second sensor module located at a return vent of the HVAC system. In further features, obtaining the second temperature includes receiving a temperature measured by a third sensor module located within a conditioned space of the HVAC system.

In yet other features, the method includes generating, in response to installation of the second air filter, a request for the operator to activate the HVAC system. In yet other features, the method includes, in response to installation of the second air filter, determining whether the HVAC system is set to a heating mode and generating in response to the HVAC system including a heat pump and being set to the heating mode, a request for the operator to activate backup electric heat.

In other features, the first particulate matter removal efficiency rating and the second particulate matter removal efficiency rating are minimum efficiency reporting value (MERV) ratings.

A non-transitory computer-readable medium storing processor-executable instructions is disclosed. The instructions include selectively generating a replacement request for an operator to replace a first air filter installed in an air handler of an HVAC system with a second air filter. The first air filter has a first particulate matter removal efficiency rating and the second air filter has a second particulate matter removal efficiency rating that is greater than the first particulate matter removal efficiency rating. The instructions further include, in response to activation of the HVAC system following installation of the second air filter, delaying for a first predetermined period of time and then obtaining (i) a first temperature that represents a temperature of air downstream of the air handler and (ii) a second temperature that represents a temperature of air upstream of the air handler. The instructions also include calculating a first temperature difference between the first temperature and the second temperature and determining whether the first temperature difference is within an acceptable range. The instructions include, in response to the first temperature difference being within the acceptable range, (i) operating the HVAC system using the second air filter and (ii) generating an alert indicating compatibility of the second air filter with the HVAC system.

In other features, the instructions further include, while the first air filter is installed, delaying for a second predetermined period of time following HVAC activation and then obtaining (i) a third temperature that represents a temperature of air downstream of the air handler and (ii) a fourth temperature that represents a temperature of air upstream of the air handler. The instructions also include calculating a second temperature difference between the third temperature and the fourth temperature, determining whether the second temperature difference is within the acceptable range, and in response to determining that the second temperature difference is outside of the acceptable range, preventing generation of the replacement request.

In yet other features, the instructions further include selecting between and performing one of (i) designating an existing air filter installed in the HVAC system as the first air filter and (ii) generating an initial request to replace the existing air filter with the first air filter.

In further features, the instructions further include, while the first air filter is installed, obtaining a first current value indicating current consumed by a circulator blower of the HVAC system and determining a threshold based on the first current value and in response to activation of the HVAC system following installation of the second air filter, obtaining a second current value indicating current consumed by the circulator blower. The instructions also include, in response to the second current value being greater than the threshold, generating an alert indicating incompatibility of the second air filter with the HVAC system.

In other features, the instructions further include obtaining, in response to activation of the HVAC system following installation of the second air filter, a current value indicating current consumed by a circulator blower of the HVAC system. The instructions also include, in response to the current value being greater than a threshold, generating an alert indicating incompatibility of the second air filter with the HVAC system.

In other features, the instructions further include determining an acceptable range of airflow for the HVAC system and in response to activation of the HVAC system following installation of the second air filter, obtaining an airflow value indicating airflow through ductwork of the HVAC system. The instructions also include, in response to the airflow value being outside of the acceptable range of airflow, generating an alert indicating incompatibility of the second air filter with the HVAC system.

In yet other features, the instructions further include disabling, in response to determining that the first temperature difference is outside of the acceptable range, operation of the HVAC system pending replacement of the second air filter.

In other features, the instructions further include, in response to determining that the first temperature difference is outside of the acceptable range, calculating a change per rating based on the first particulate matter removal efficiency rating, the second particulate matter removal efficiency rating, the first temperature difference, and, in some implementations, the second temperature difference and determining a highest suitable particulate matter removal efficiency rating for the HVAC system based on the change per rating. The instructions also include generating an indication of the highest suitable particulate matter removal efficiency rating for the HVAC system.

In other features, obtaining the first temperature includes receiving a temperature measured by a first sensor module located at a supply vent of the HVAC system. In yet other features, obtaining the second temperature includes receiving a temperature measured by a thermostat.

In other features, obtaining the second temperature includes receiving a temperature measured by a second sensor module located at a return vent of the HVAC system. In further features, obtaining the second temperature includes receiving a temperature measured by a third sensor module located within a conditioned space of the HVAC system.

In other features, the instructions further include generating, in response to installation of the second air filter, a request for the operator to activate the HVAC system. In yet other features, the instructions further include determining, in response to installation of the second air filter, whether the HVAC system is set to a heating mode. The instructions include, in response to the HVAC system including a heat pump and being set to the heating mode, generating a request for the operator to activate backup electric heat.

In other features, the first particulate matter removal efficiency rating and the second particulate matter removal efficiency rating are minimum efficiency reporting value (MERV) ratings.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
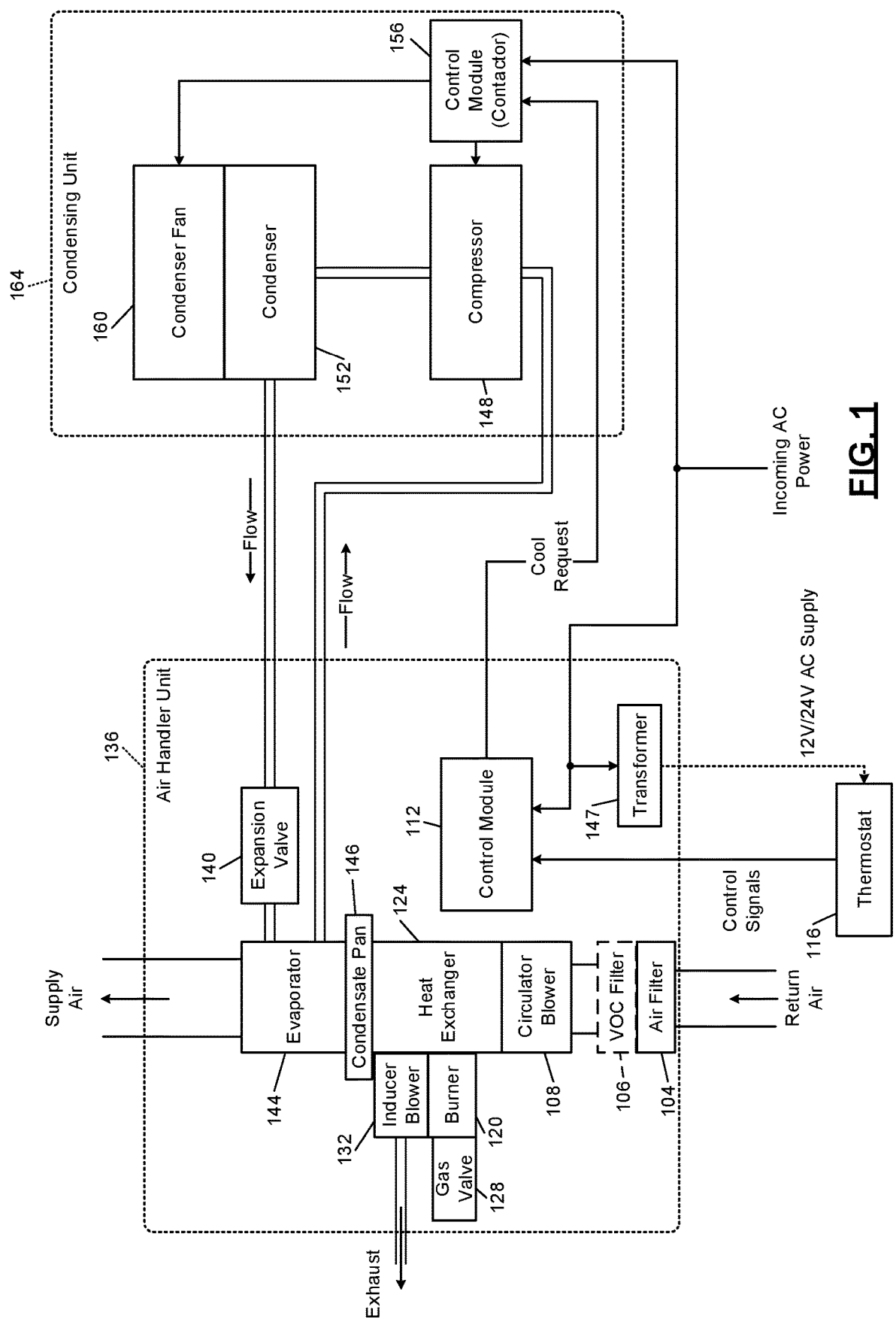
FIG. 1 is a block diagram of an example heating, ventilation, and air conditioning (HVAC) system.

Typically, building owners and HVAC contractors install low-priced air filters in HVAC systems. Although low-priced air filters are often sufficient to protect the HVAC system from damage due to debris, they are not effective at removing fine particulate matter from the air. HVAC air filters are assigned a minimum efficiency reporting value (MERV) based on their filtration efficiency. Air filters with a higher MERV rating remove a larger percentage of particulate matter than air filters with a lower MERV rating. Particulate matter 1 micron or smaller in size poses the greatest risk to health in humans. Therefore, air filters that remove more sub-micron particulate matter are preferable.

A typical lost-cost air filter may have a MERV rating of 7, removing only 50%-70% of particulate matter 3 microns or larger in size and removing negligible amounts of particulate matter that is smaller than 3 microns. In contrast, an air filter with a MERV rating of 14 removes at least 90% of the particulate matter 3 microns or larger, 90% of the particulate matter between 3 microns and 1 micron, and 75%-85% of the particulate matter between 0.3 micron and 1 micron. Although air filters with ratings above MERV 14 exist, these filters are generally considered too restrictive for most HVAC systems—particularly older HVAC systems. The circulator blowers in HVAC systems may not be capable of sustaining sufficient airflow when an air filter with a rating greater than MERV 14 is installed.

Many building owners and HVAC contractors are concerned about installing air filters with a high MERV rating because they may negatively affect the operation of the HVAC system. For example, they may believe that such air filters will decrease the airflow of the HVAC system and/or increase the wear of a circulator blower. However, the majority of HVAC systems installed since approximately 2003 are capable of operating with a MERV 14 filter.

According to the present disclosure, one or more indoor air quality (IAQ) sensor modules can be used to determine whether an air filter with a higher MERV rating (such as MERV 14) may be used in an HVAC system. For example, temperatures may be obtained from one or more IAQ sensor modules (and sometimes other sources, such as the thermostat) that approximate temperature of return air returning to the HVAC system and temperature of supply air supplied to the conditioned space by the HVAC system.

With the higher-rated air filter installed, a testing device receives the temperature information and determines whether the measured temperature split (the difference between the return air temperature and the supply air temperature) is within an acceptable range. The acceptable range may be looked up based on the make, model, and configuration of the HVAC system. Alternatively, the testing device may use a lookup table of predetermined original equipment manufacturer (OEM) acceptable ranges. The lookup table may list acceptable temperature ranges associated with different heating and cooling capacities. If the temperature split is not within the acceptable range, the higher-rated air filter may be declared too restrictive. In various implementations, the lower-rated air filter (such as a MERV 7 rated air filter) may be tested prior to testing the higher-rated air filter to confirm that the temperature split begins within the acceptable range. To remove a source of error, the lower-rated filter may be replaced with a brand-new lower-rated baseline air filter before testing—for example, a new MERV 7 rated air filter.

The testing device may additionally or alternatively determine whether HVAC system airflow is sufficient with the higher-rated air filter installed. Again, the testing device may first confirm that HVAC airflow was sufficient with lower-rated air filter installed. The testing device may additionally or alternatively determine whether electrical current consumed (or another electrical parameter, such as power consumed) by the circulator blower in the HVAC system airflow is overly high with the higher-rated air filter installed. The limit for current may be determined by performing measurements with the lower-rated air filter installed.

In a case where the higher-rated air filter is not appropriate for the HVAC system, as indicated by parameters including temperature split, airflow, and/or current, the testing device may indicate that the higher-rated air filter must be replaced before normal operation of the HVAC system can resume. The testing device may perform linear or non-linear extrapolation of the parameters to estimate a highest rating for an air filter between the lower-rated and higher-rated air filters that would be suitable for the HVAC system.

In FIG. 1, a block diagram of an example HVAC system is presented. As used in this application, the term HVAC encompasses all environmental comfort systems in a building, including heating, cooling, humidifying, dehumidifying, air exchanging, and purifying. Environmental comfort systems include devices such as furnaces, heat pumps, humidifiers, dehumidifiers, ventilators, and air conditioners. HVAC systems as described in this application do not necessarily include both heating and air conditioning, and may instead have only one or the other.

In this particular example, a forced-air system with a gas furnace is shown. Return air is pulled from the building through an air filter 104 by a circulator blower 108. The air filter 104 reduces the amount of particulate matter in the return air. The return air may also be drawn through a volatile organic compound (VOC) filter 106. The VOC filter 106 reduces the amount of VOCs in the return air. The VOC filter 106 may be an absorbent type VOC filter. For example, the VOC filter 106 may be an activated charcoal filter, an alumina oxide filter, a zeolite filter, or a baking soda filter. In various implementations, the air filter 104 may be both a particulate matter filter and an absorbent type VOC filter, which may be integrated into a single filter frame. The circulator blower 108, also referred to as a fan, is controlled by a control module 112. The control module 112 receives signals from a thermostat 116. For example only, the thermostat 116 may include one or more temperature setpoints specified by the user. The thermostat 116 may be a WiFi thermostat having wireless networking capability.

The thermostat 116 may direct that the circulator blower 108 be turned on at all times or only when a heat request or cool request is present (automatic fan mode). In various implementations, the circulator blower 108 can operate at one or more discrete speeds or at any speed within a predetermined range. For example, the control module 112 may actuate one or more switching relays (not shown) to control the circulator blower 108 and/or to select a speed of the circulator blower 108.

The thermostat 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a temperature high enough that gas introduced to the heated surface will combust. Fuel for combustion, such as natural gas, may be provided by a gas valve 128.

The products of combustion are exhausted outside of the building. In a high efficiency furnace, the products of combustion may not be hot enough to have sufficient buoyancy to exhaust via convection. Therefore, an inducer blower 132 creates a draft to exhaust the products of combustion. The inducer blower 132 may be turned on prior to ignition of the burner 120. The inducer blower 132 may remain running while the burner 120 is operating. In addition, the inducer blower 132 may continue running for a set period of time after the burner 120 turns off.

An enclosure, which will be referred to as air handler unit 136, may include the air filter 104, the VOC filter 106, the circulator blower 108, the control module 112, the burner 120, the heat exchanger 124, the inducer blower 132, an expansion valve 140, an evaporator 144, a condensate pan 146, and a transformer 147. The transformer 147 is connected to an alternating current (AC) power line in order to provide AC power to the control module 112 and the thermostat 116. For example, the transformer 147 may be a 10-to-1 transformer and therefore provide either a 12 V or 24 V AC supply depending on whether the air handler unit 136 is operating on nominal 120 V or nominal 240 V power. In various implementations, the air handler unit 136 includes an electrical heating device (not shown) instead of or in addition to the burner 120. When used in addition to the burner 120, the electrical heating device may provide backup or secondary (extra) heat.

The HVAC system of FIG. 1 includes a split air conditioning system. Refrigerant is circulated through a compressor 148, a condenser 152, the expansion valve 140, and the evaporator 144. The evaporator 144 is placed in series with the supply air so that, when cooling is desired, the evaporator 144 removes heat from the supply air, thereby cooling the supply air. During cooling, the evaporator 144 is cold (generally, below the dew point of the air within the building), which causes water vapor to condense. This water vapor is collected in the condensate pan 146, which drains or is pumped out.

A control module 156 receives a cool request from the control module 112 and controls the compressor 148 accordingly. The control module 156 also controls a condenser fan 160, which increases heat exchange between the condenser 152 and outside air. In such a split system, the compressor 148, the condenser 152, the control module 156, and the condenser fan 160 are generally located outside of the building, often in an enclosure referred to as a condensing unit 164.

In various implementations, the control module 156 may include a run capacitor, a start capacitor, and a contactor or relay. In various implementations, the start capacitor may be omitted, such as when the condensing unit 164 includes a scroll compressor instead of a reciprocating compressor. The compressor 148 may be a variable-capacity compressor and may respond to a multiple-level cool request. For example, the cool request may indicate a mid-capacity call for cooling or a high-capacity call for greater cooling. The compressor 148 may vary its capacity according to the cool request.

The electrical lines provided to the condensing unit 164 may include a 240 V mains power line and a 24 V switched control line. The 24 V control line may correspond to the cool request shown in FIG. 1. The 24 V control line controls operation of the contactor. When the control line indicates that the compressor should be on, the contactor contacts close, connecting the 240 V power supply to the compressor 148. In addition, the contactor may connect the 240 V power supply to the condenser fan 160. In various implementations, such as when the condensing unit 164 is located in the ground as part of a geothermal system, the condenser fan 160 may be omitted. When the 240 V mains power supply arrives in two legs, as is common in the U.S., the contactor may have two sets of contacts, and can be referred to as a double-pole single-throw switch.

The thermostat 116 typically includes a temperature sensor and sometimes includes a relative humidity sensor. When in a heating (heat) mode, the thermostat 116 generates a heat request when the temperature measured by the temperature sensor is less than a lower temperature limit. When in a cooling (cool) mode, the thermostat 116 generates a cool request when the temperature measured by the temperature sensor is greater than an upper temperature limit. The upper and lower temperature limits may be set based on a setpoint temperature plus and minus a respective predetermined amount (such as 1, 2, 3, 4, 5 degrees Fahrenheit). The setpoint temperature may be set to a predetermined temperature by default and may be adjusted by a user.

In many systems, the air handler unit 136 is located inside the building, while the condensing unit 164 is located outside the building. The present disclosure is not limited to that arrangement, however, and applies to other systems including, as examples only, systems where the components of the air handler unit 136 and the condensing unit 164 are located in close proximity to each other or even in a single enclosure. The single enclosure may be located inside or outside of the building. In various implementations, the air handler unit 136 may be located in a basement, garage, or attic. In ground source systems, where heat is exchanged with the earth, the air handler unit 136 and the condensing unit 164 may be located near the earth, such as in a basement, crawlspace, garage, or on the first floor, such as when the first floor is separated from the earth by only a concrete slab.

In split HVAC systems, an air handler unit is often located indoors and a condensing unit is often located outdoors. In heat pump systems, the function of the air handler unit and the condensing unit are reversed depending on the mode of the heat pump. As a result, although the present disclosure uses the terms air handler unit and condensing unit, the terms indoor unit and outdoor unit could be used instead in the context of a heat pump. The terms indoor unit and outdoor unit emphasize that the physical locations of the components stay the same while their roles change depending on the mode of the heat pump. A reversing valve selectively reverses the flow of refrigerant from what is shown in FIG. 1 depending on whether the system is heating the building or cooling the building in a heat pump system. When the flow of refrigerant is reversed, the roles of the evaporator and condenser are reversed—in other words, refrigerant evaporation occurs in what is labeled the condenser while refrigerant condensation occurs in what is labeled as the evaporator.

Figure 2:
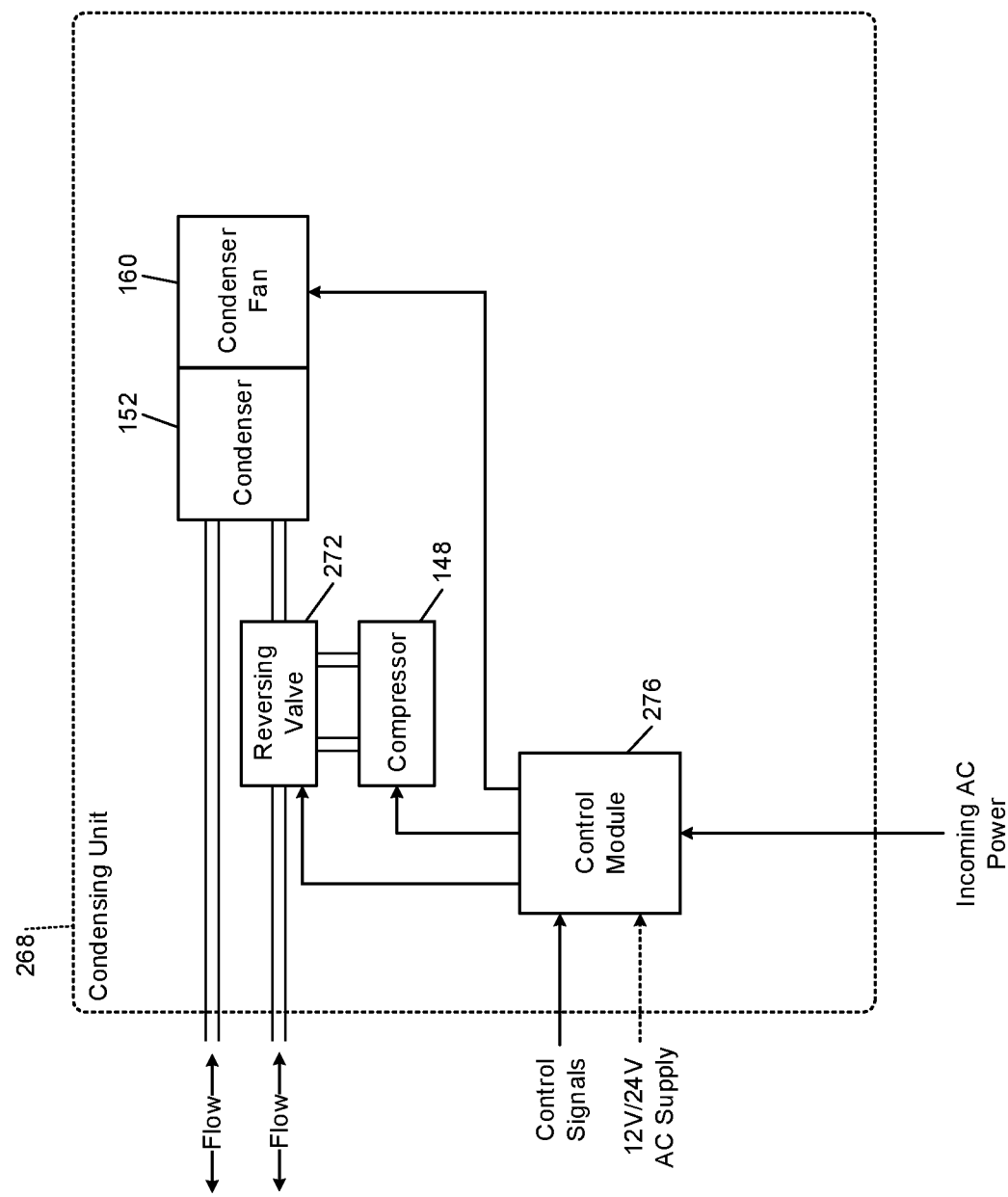
FIG. 2 is a functional block diagram of an example condenser unit of an example HVAC system that includes a heat pump.

In FIG. 2, an example condensing unit 268 is shown for a heat pump implementation in which the HVAC system would include the condensing unit 268 in place of the condensing unit 164 of FIG. 1. The condensing unit 268 may be configured similarly to the condensing unit 164 of FIG. 1. Although referred to as the condensing unit 268, the mode of the heat pump determines whether the condenser 152 of the condensing unit 268 is actually operating as a condenser or as an evaporator. A reversing valve 272 is controlled by a control module 276 and determines whether the compressor 148 discharges compressed refrigerant toward the condenser 152 (cooling mode) or away from the condenser 152 (heating mode). The control module 276 controls the reversing valve 272 and the compressor 148 based on the control signals. The control module 276 may receive power from, for example, the transformer 147 of the air handler unit 136 or the incoming AC power line.

Figure 3:
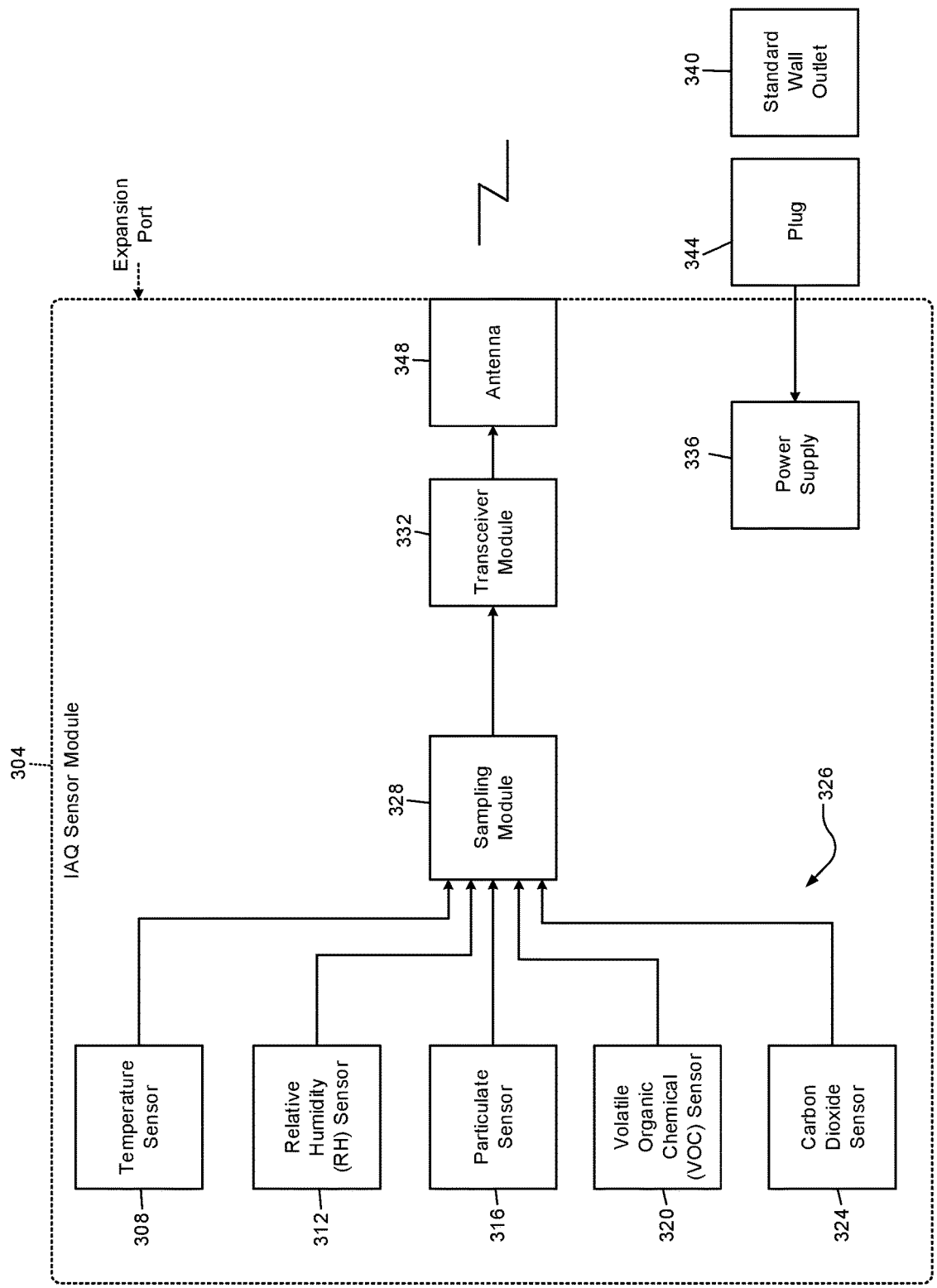
FIG. 3 is a functional block diagram of an example indoor air quality (IAQ) sensor module that can be used with an HVAC system and/or other IAQ mitigation devices.

FIG. 3 includes a functional block diagram of an example indoor air quality (IAQ) sensor module 304 that can be used with an HVAC system and/or one or more other mitigation devices. The IAQ sensor module 304 includes one or more of: a temperature sensor 308, a relative humidity sensor 312, a particulate sensor 316, a VOC sensor 320, and a carbon dioxide sensor 324. The IAQ sensor module may also include one or more other IAQ sensors, such as occupancy, barometric pressure, airflow, light, sound, etc. The included sensors of the IAQ sensor module 304 will be referred to collectively as IAQ sensors 326. The IAQ sensor module 304 may also include a sampling module 328 and a transceiver module 332.

A power supply 336 may receive AC power from a standard wall outlet (or receptacle) 340 via a plug 344. For example, the standard wall outlet 340 may provide nominal 120 V or nominal 240 V AC power. The power supply 336 may include an AC-to-DC converter that converts the AC power into DC power, such as 5 V, 12 V, or 24 V DC power. The power supply 336 supplies power to the components of the IAQ sensor module 304, including the sensors, the sampling module 328, and the transceiver module 332. In various implementations, the power supply 336 may provide two or more different DC voltages to different components of the IAQ sensor module 304. In other implementations, the power supply 336 may be integrated with the plug 344.

Additionally or alternatively, the power supply 336 may include a battery (or multiple batteries) and/or a solar cell (or multiple solar cells) that supplies power to the components of the IAQ sensor module 304. The battery may be replaceable or non-replaceable. In the example of the battery being non-replaceable, the battery may be re-chargeable, such as via a standard wall outlet. In this example, the IAQ sensor module 304 may include a charger that charges the battery using power supplied, for example, via the standard wall outlet 340.

The IAQ sensor module 304 may be portable for easy movement into different rooms of a building. The IAQ sensor module 304 could also be placed outside the building, for example, to measure one or more conditions outside of the building, for calibration, or for other reasons. The temperature sensor 308 measures a temperature of air at the IAQ sensor module 304. The relative humidity sensor 312 measures a relative humidity of air at the IAQ sensor module 304. The particulate sensor 316 measures an amount (for example, micrograms (µg)) of particulate in air (for example, a cubic meter ($m^3$)) at the IAQ sensor module 304 having a diameter that is less than a predetermined size (for example, 2.5 or 10 micrometers (µm)). The VOC sensor 320 measures an amount (for example, parts per billion (ppb)) of VOC in air at the IAQ sensor module 304. The carbon dioxide sensor 324 measures an amount (for example, parts per million (ppm)) of carbon dioxide in air at the IAQ sensor module 304.

The sampling module 328 samples (analog) measurements of the IAQ sensors 326. The sampling module 328 may also digitize and/or store values of the measurements of the IAQ sensors 326. In various implementations, the IAQ sensors 326 may be digital sensors and output digital values corresponding to the respective measured parameters. In such implementations, the sampling module 328 may perform a storage function or may be omitted.

The IAQ sensor module 304 may include one or more expansion ports to allow for connection of additional sensors and/or to allow connection to other devices. Examples of other devices include one or more other IAQ sensor modules, other types of IAQ sensors not included in the IAQ sensor module 304, a home security system, a proprietary handheld device for use by contractors, a mobile computing device, and other types of devices.

The transceiver module 332 transmits frames of data corresponding to predetermined periods of time. Each frame of data may include the measurements of the IAQ sensors 326 over a predetermined period. One or more calculations may be performed for the data of each frame of data, such as averages. Each frame (including the calculations and/or the measurements) may be transmitted to an air filter evaluation device, as discussed further below. The measurements of the IAQ sensors 326 may be sampled at a predetermined rate, such as 10 samples per minute or another suitable rate. In various implementations, individual sensors of the IAQ sensors 326 may be sampled at different rates. Each frame may correspond to a predetermined number of sets of samples (e.g., 10) or a predetermined window of time.

The transceiver module 332 transmits each frame (including the calculations and/or the measurements) to the thermostat 116 and/or a computing device, such as a smartphone, tablet, or another type of computing device. The transceiver module 332 transmits the frames wirelessly via one or more antennas, such as antenna 348, using a proprietary or standardized, wired or wireless protocol, such as Bluetooth, ZigBee (IEEE 802.15.4), 900 Megahertz, 2.4 Gigahertz, or WiFi (IEEE 802.11). The IAQ sensor module 304 may communicate directly with the thermostat 116 and/or the separate computing device. In various implementations, a gateway is implemented, which creates a wireless network for the IAQ sensor module 304, the thermostat 116, and the separate computing device.

Figure 4:
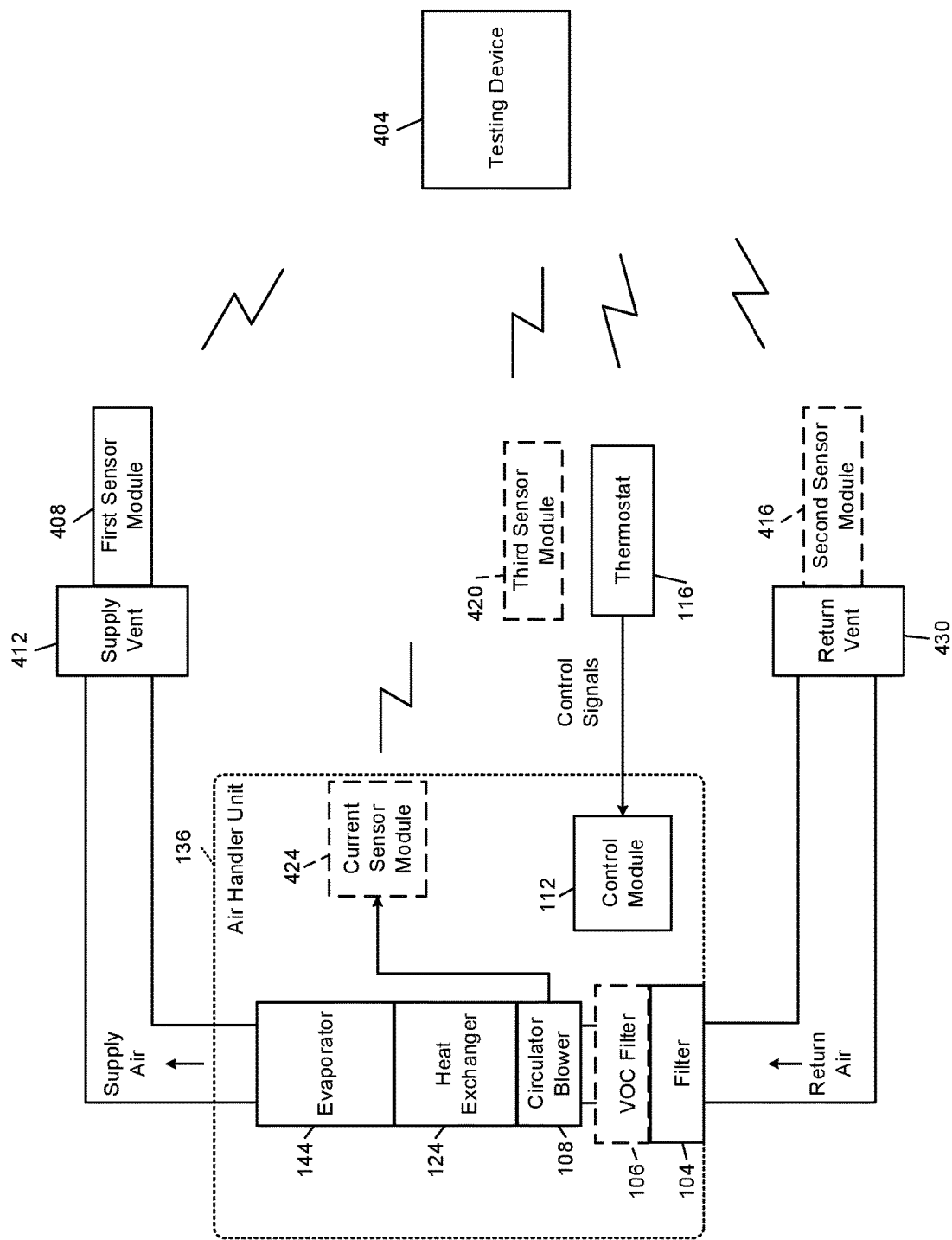
FIG. 4 is a functional block diagram of an example HVAC evaluation system.

Referring now to FIG. 4, a functional block diagram of an HVAC evaluation system is presented. In an example implementation, the air filter evaluation system includes a testing device 404, a first sensor module 408, and the thermostat 116. The testing device 404 is configured to determine whether an HVAC system can properly operate with an air filter that removes a substantial percentage of sub-micron particulate matter—for example, a MERV 14 rated air filter. The testing device 404 is configured to receive temperature data from the first sensor module 408 and the thermostat 116. The first sensor module 408 is located near a supply vent 412 that emits air supplied from the air handler unit 136 or within ductwork leading to the supply vent 412. The first sensor module 408 is configured to measure and transmit the temperature of the air supplied by the air handler unit 136. The first sensor module 408 may be implemented by the IAQ sensor module 304.

In other implementations, the HVAC evaluation system may include one or more of a second sensor module 416, a third sensor module 420, and a current sensor module 424. The second sensor module 416 is located near a return air vent 430 that supplies air to the air handler unit 136 or within the ductwork leading to the filter 104. The second sensor module 416 is configured to measure and transmit the temperature of the air returned to the air handler unit 136. The third sensor module 420 is located in a room that is supplied with air from the air handler unit 136 and is configured to measure and transmit the temperature of the air in the room. For example, the third sensor module 420 may be located near or integrated with the thermostat 116. The second sensor module 416 and the third sensor module 420 may be IAQ sensors such as the IAQ sensor module 304. The current sensor module 424 is configured to measure the current that flows through a motor of the circulator blower 108 and to transmit the measured current to the testing device 404.

Figure 5:
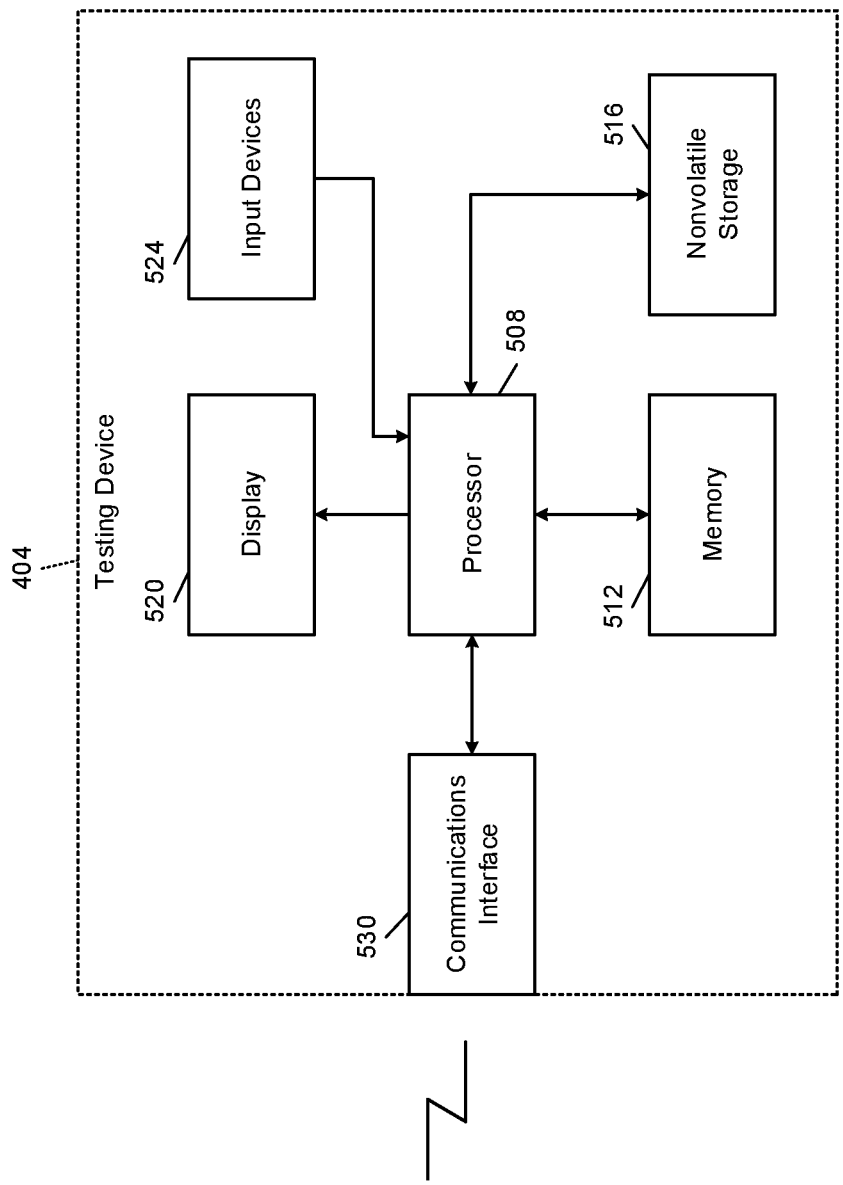
FIG. 5 is a block diagram of an example testing device.

FIG. 5 is a functional block diagram of an example implementation of the testing device 404 and may be used to implement the systems and methods described in this document. The testing device 404 may be a digital computer, such as a laptop, a desktop, a workstation, a personal digital assistant, a smartphone, a tablet, or other appropriate computer. In other implementations, the testing device 404 may be a controller associated with the HVAC system—for example, the thermostat 116. The components shown, connections, relationships between components, and corresponding functions are meant to be example only, and are not meant to limit implementations of the disclosure described and/or claimed in this document.

The testing device 404 includes a processor 508, a memory 512, a non-volatile storage 516, a display 520, input devices 524, and a communications interface 530. Each of the components 508, 512, 516, 524, and 530 are interconnected using various busses. The processor 508 executes instructions from the memory 512, and may operate on (read and/or write) data stored in the memory 512. Generally, the memory 512 includes volatile memory, such as dynamic random access memory. The processor 508 communicates, potentially via a chipset (not shown), with the non-volatile storage 516, which may include flash memory acting as a cache of instructions and/or data.

In various implementations, larger capacity and lower cost storage may also be included in the non-volatile storage 516. For example, optical drives, tape drives, or magnetic storage media, such as hard drives, may be used to store data in the non-volatile storage 516. Active portions of the data and/or instructions may be cached in the memory 512 and/or in flash memory portions of the non-volatile storage 516.

The input devices 524 receive user input, and may include devices such as a keyboard, a mouse, a touchpad, a digitizer tablet, etc. The display 520 displays data to a user and, in various implementations, may be combined with a touch sensitive input device in the form of a touchscreen. The communications interface 530 allows the testing device 404 to communicate with the thermostat 116, the first sensor module 408, the second sensor module 416, the third sensor module 420, the current sensor module 424, and other computing devices.

Figure 6:
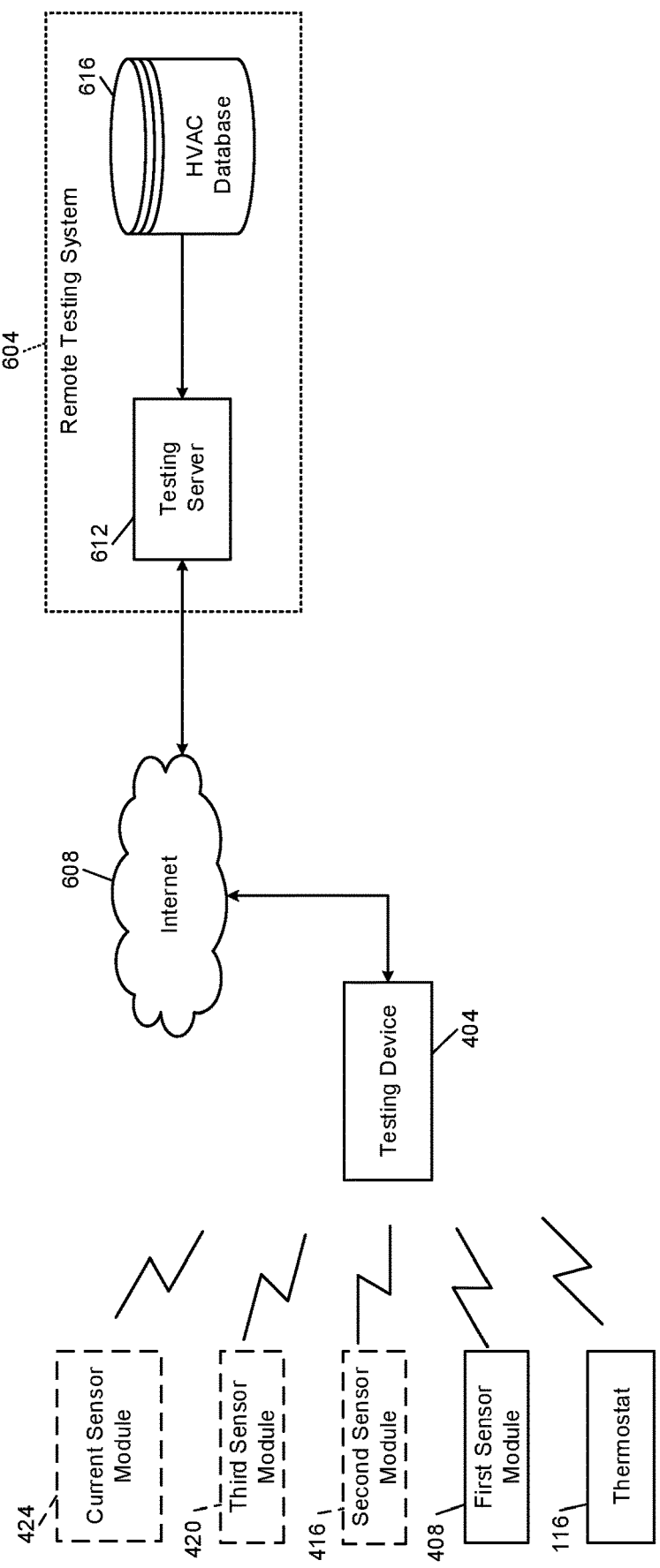
FIG. 6 is a functional block diagram of an example HVAC evaluation system including a remote testing system.

FIG. 6 is a functional block diagram showing the testing device 404 communicating with the thermostat 116, the first sensor module 408, the second sensor module 416, the third sensor module 420, the current sensor module 424, and a remote testing system 604. The testing device 404 is connected to the remote testing system 604 via the Internet 608. The remote testing system 604 includes a testing server 612 and an HVAC database 616. The HVAC database 616 stores information of various HVAC components such as the air handler unit 136 and the circulator blower 108. The testing server 612 is configured to receive data identifying an HVAC component, for example, a model number, from the testing device 404, retrieve the information associated with the identified HVAC component from the HVAC database 616, and transmit the information to the testing device 404.

Figure 7A:
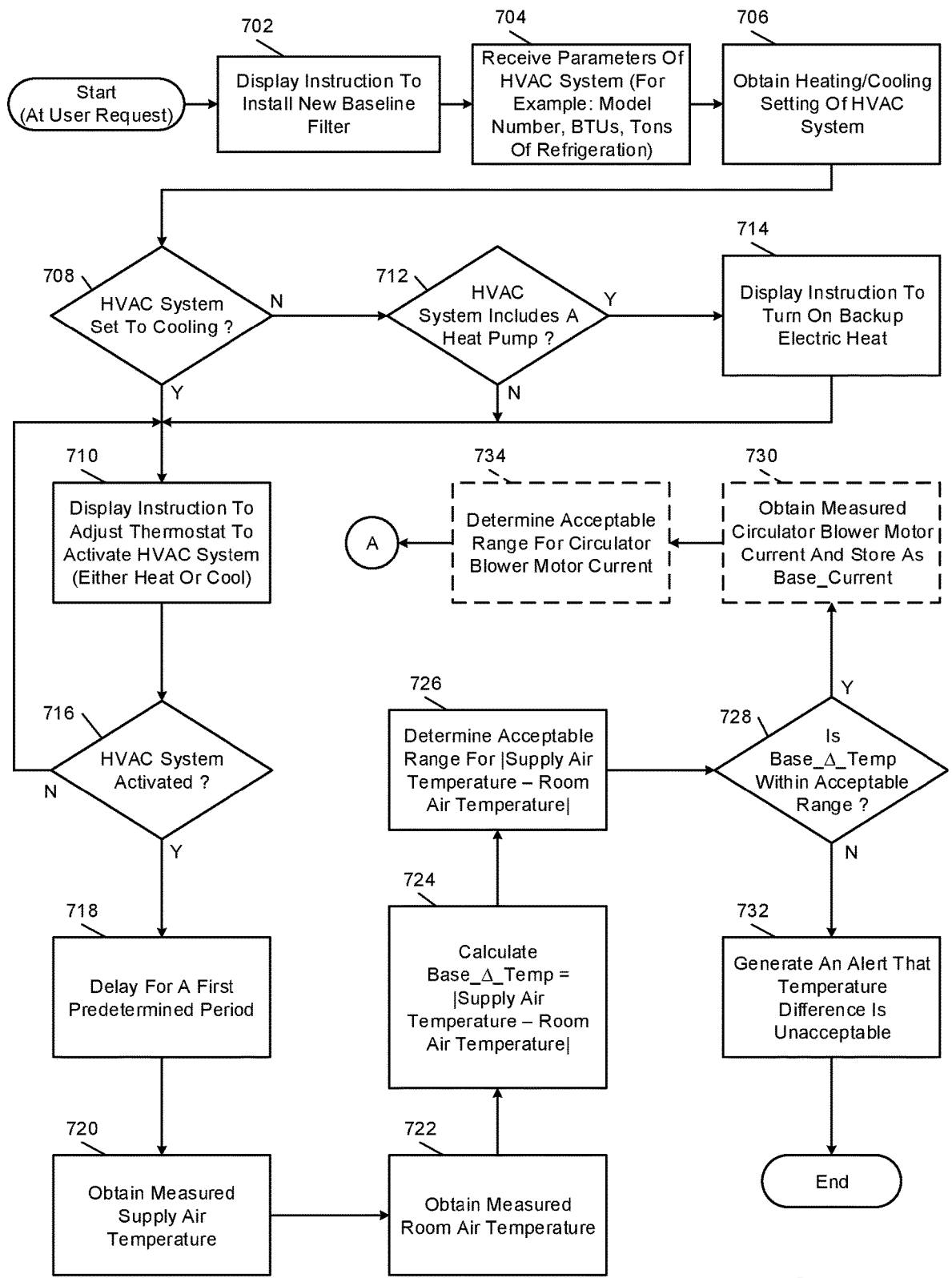
FIGS. 7A-7C are a flowchart depicting an example method of evaluating the use of different grade air filters in an HVAC system based on air temperature, air flow, and circulator blower current.
Figure 7B:
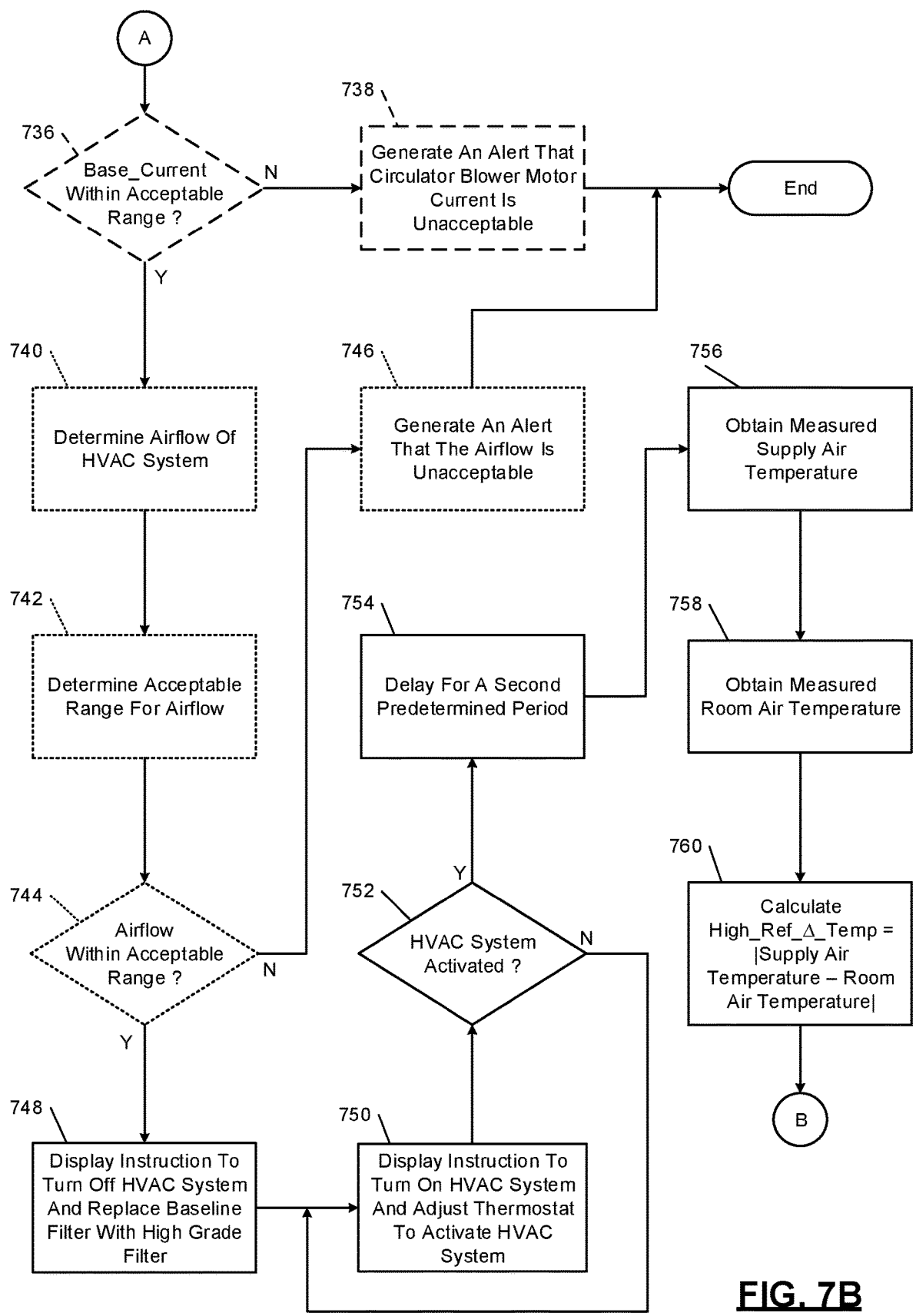
Figure 7C:
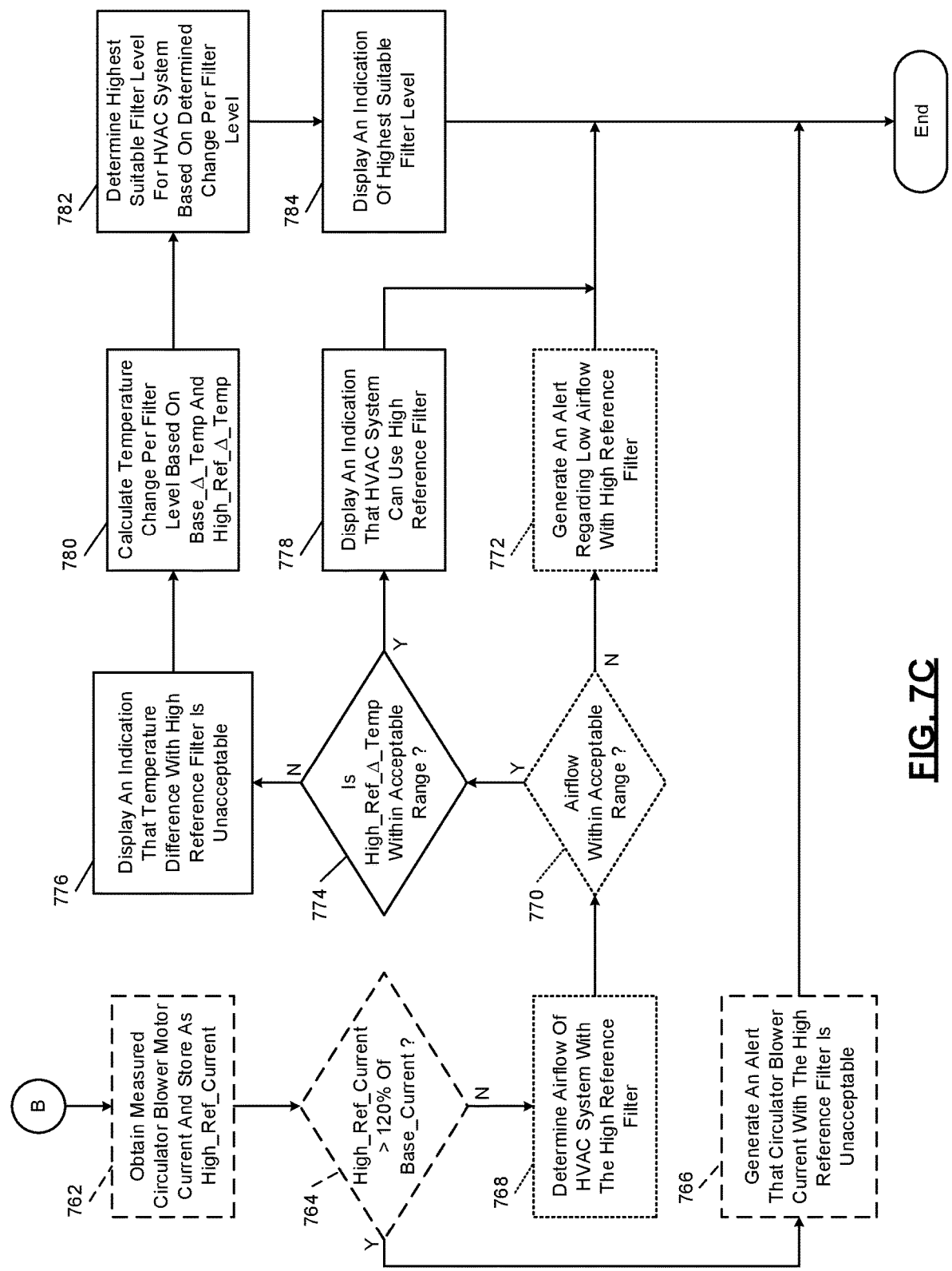

FIGS. 7A-7C are a flowchart depicting an example method for evaluating the use of an air filter—for example, a MERV 14 rated air filter—in an HVAC system. In an example implementation, control may be performed by the testing device 404. In other implementations, control may be performed by the testing device 404 and the thermostat 116, which may be a WiFi thermostat. In various implementations, control may be performed partially or completely by a mobile device (such as a tablet or smartphone) that communicates with the sensors directly or via the testing device 404.

Control begins with 702 where control selectively causes display of an instruction to install a new baseline air filter, such as a new MERV 7 rated air filter, as the air filter 104. For example, control may display this instruction in response to information indicating that the existing air filter is dirty or non-standard. For example, control may assess dirtiness of the existing air filter based on information provided by the contractor or runtime data provided by the HVAC system; if control determines that the existing air filter has been in place for more than 3 months, control may assume that the existing air filter is dirty. The new baseline air filter may be included as part of an installation package.

Control continues with 704. At 704, control receives information regarding the parameters of the of the HVAC system. For example, the testing device 404 may prompt an operator to enter a model number of the air handler unit 136 using the input devices 524 of the testing device 404. In various implementations, the operator may be a building owner, such as a homeowner, or an HVAC contractor. The testing device 404 may also prompt the operator to enter additional information about the HVAC system, such as the British Thermal Unit (BTU) rating or the cooling tonnage of the HVAC system. Alternatively, the testing device 404 may transmit the model number entered by the operator to the remote testing system 604. In response the testing server 612 retrieves information stored in the HVAC database 616 that is associated with the model number and transmits the information to the testing device 404. Control then continues with 706.

At 706, control obtains the current heating/cooling setting of the HVAC system. For example, the testing device 404 may communicate with the thermostat 116 to obtain this information or may prompt the operator to provide the information via the input devices 524. Control then continues with 708. At 708, control determines whether the HVAC system is set to cool. If so, control progresses to 710; otherwise, control transfers to 712. At 712, control determines whether the HVAC system includes a heat pump. If so, control transfers to 714; otherwise, control transfers to 710. At 714, control causes an instruction to turn on the backup electric heat to be displayed to the operator. Control continues with 710. When the HVAC system includes a heat pump and is not set to cool, the use of backup electric heat produces more consistent temperature differentials and, therefore, improves the accuracy of the HVAC system evaluation.

At 710, control causes an instruction to be displayed requesting that the operator activate the HVAC system by adjusting the thermostat. For example, the testing device 404 may instruct the operator to lower the thermostat temperature if the HVAC system is set to cool or to increase the thermostat temperature if the HVAC system is set to heat. Control then continues with 716. At 716, control determines whether the HVAC system has been activated. The testing device 404 may communicate with the thermostat 116 to determine if the HVAC system is activated or may prompt the operator to use the input devices 524 to confirm that the HVAC is activated. If 716 is false, control returns to 710. If 716 is true, control progress to 718 where control delays for a first predetermined period of time, such as 10 minutes. The delay provides sufficient time for temperatures (such as the supply air temperature) to stabilize. Control then progresses to 720.

At 720, control obtains the measured air supply temperature. For example, the testing device 404 may receive the air supply temperature transmitted by the first sensor module 408. Control then progresses to 722. At 722, control obtains an air temperature approximating the return air temperature. For example, the testing device 404 may receive a room air temperature transmitted by either the thermostat 116 or the third sensor module 420. Alternatively, if the testing device determines that the room temperature differs significantly— for example, more than 25%—from an air temperature of the return air received from the second sensor module 416, the testing device 404 may use the air temperature of the return air from the second sensor module 416. Control continues with 724.

At 724, control calculates the absolute value of the difference between the supply air temperature and the room air temperature and stores the value as Base_$\Delta$_Temp. Control then progress to 726. At 726, control determines an acceptable range of values for the difference between the supply air temperature and the room air temperature for the HVAC system. The testing device 404 uses the received information of the HVAC system to determine the acceptable range. For example, the testing device 404 may retrieve an acceptable range associated with the air handler unit 136 stored in the non-volatile storage 516. Alternatively, the testing device 404 may communicate with the remote testing system 604 to obtain the acceptable range associated with the air handler unit 136. Control then continues with 728.

At 728, control determines whether the calculated value of Base_$\Delta$_Temp is within the acceptable range. If 728 is true, control progresses to 730, as described below. If 728 is false, control transfers to 732.

At 732, control generates an alert indicating that the temperature difference of the HVAC system with the baseline filter installed is unacceptable. The testing device 404 may present the alert to the operator on the display 520. If the currently installed filter is not new, the filter may be dirty enough that airflow restrictions have resulted in the Base_$\Delta$_Temp being outside the acceptable range. In such a case, control may return to 702 to instruct the user to install a new baseline filter.

However, if the filter is new, other system problems (such as airflow restrictions, refrigerant charge problems, compressor issues) may have caused the Base_$\Delta$_Temp to fall outside the acceptable range. In such a case, the alert may indicate that contractor diagnosis is necessary. Control then ends.

At 730, control obtains a current through a motor of the circulator blower 108 and stores the value as Base_Current. The testing device 404 may receive the current transmitted by the current sensor module 424. Alternatively, the testing device 404 may prompt the operator to use the input devices 524 to enter the current supplied to the circulator blower 108. At 734, control determines an acceptable range of values for the measured current. The testing device 404 uses the received information of the HVAC system to determine the acceptable range. For example, the testing device 404 may retrieve an acceptable range associated with the air handler unit 136 stored in the non-volatile storage 516. Alternatively, the testing device 404 may communicate with the remote testing system 604 to obtain the acceptable range associated with the air handler unit 136. Control then continues with 736 of FIG. 7B.

At 736, control determines whether the Base_Current is within the acceptable range. If 736 is false, control transfers to 738. At 738, control generates an alert indicating that the current through the motor of the circulator blower 108 is not within the acceptable range. Control then ends. If 736 is true, control progresses to 740 as described below. In some implementations, the current through the motor of the circulator blower 108 is not used in the evaluation process. In such implementations, elements 730-738 may be omitted and, if 728 is true, control progresses directly to 740.

At 740, control determines airflow of the air handler unit 136. The testing device 404 may determine the airflow based on the difference between the supply air temperature and the room air temperature using known airflow calculation formulas. In some implementations, additional information, such as the BTU rating of the HVAC system, may be used to determine the airflow. For example, the testing device 404 may approximate the airflow as a ratio of adjusted BTUs to temperature split. The adjusted BTUs may be calculated by dividing the BTU rating of the HVAC system by a scalar, such as 1.08. The temperature split may be calculated as the difference between the supply and return air temperatures.

Control continues with 742. At 742, control determines an acceptable range of airflow values for HVAC system. The testing device 404 uses the received information of the HVAC system to determine the acceptable range. For example, the testing device 404 may retrieve an acceptable range associated with the air handler unit 136 stored in the non-volatile storage 516. Alternatively, the testing device 404 may communicate with the remote testing system 604 to obtain the acceptable range associated with the air handler unit 136. Control then continues with 744.

At 744, control determines whether the determined airflow is within the acceptable range. If 744 is false, control transfers to 746. At 746, control generates an alert that indicates that the airflow of the HVAC system is not within the acceptable range. Control then ends. If 744 is true, control progresses to 748, as described below. In some implementations, the airflow of the HVAC system is not used in the evaluation process. In such implementations, elements 740-746 may be omitted and, if 736 is true, control progresses directly to 748.

At 748, control causes instructions to be displayed prompting the operator to turn off the HVAC system and replace the baseline air filter with a new, MERV 14 rated air filter. At 750, control then causes a display of an instruction to activate the HVAC system by adjusting the thermostat. The testing device 404 may use the display 520 to display the instructions. Control then continues with 752. As described above, the testing device 404 may instruct the operator to lower the thermostat temperature if the HVAC system is set to cool or to increase the thermostat temperature if the HVAC system is set to heat.

At 752, control determines whether the HVAC system has been activated. The testing device 404 may communicate with the thermostat 116 to determine if the HVAC system is activated. Alternatively, the testing device 404 may prompt the operator to use the input devices 524 to confirm that the HVAC is activated. If 752 is false, control returns to 750. If 752 is true, control progress to 754 where control delays for a second predetermined period of time, such as 10 minutes. The delay provides sufficient time for temperatures to stabilize. Control then progresses to 756.

At 756, control obtains the measured air supply temperature. As described above, the testing device 404 may receive the air supply temperature transmitted by the first sensor module 408. Control then progresses to 758. At 758, control obtains a new measured value approximating return air temperature. Control continues with 760. At 760, control calculates the absolute value of the difference between the supply air temperature and the room air temperature and stores the value as High_Ref_$\Delta$_Temp. Control then continues with 762 of FIG. 7C.

At 762, control obtains a current through the motor of the circulator blower 108 while the air filter with the high MERV rating is installed and stores the value as High_Ref_Current. As described above, the testing device 404 may receive the current transmitted by the current sensor module 424 or prompt the operator to use the input devices 524 to enter the current through the motor of the circulator blower 108. Control then continues with 764. At 764, control determines whether the High_Ref_Current is more than a predetermined percentage (such as 120%) of the Base_Current. If so, control transfers to 766; otherwise, control transfers to 768. At 766, control generates an alert indicating the fan current while the air filter with the high MERV rating is installed is not acceptable—the current is too high. Control then ends. In some implementations, the current through the motor of the circulator blower 108 is not used in the evaluation process. In such implementations, elements 762-766 may be omitted and control progresses directly from 760 to 768.

At 768, control determines airflow of the air handler unit 136 while the air filter with the high MERV rating is installed. The testing device 404 may determine the airflow of the HVAC system as previously described. Control continues with 770. At 770, control determines whether the determined airflow is within the acceptable range of airflow values for the HVAC system or that the airflow of the air handler unit 136 while the high MERV rated air filter is installed is not less than 90% of the airflow of the air handler unit 136 while the baseline air filter was installed. If 770 is false, control transfers to 772. At 772, control generates an alert indicating that the airflow of the HVAC system while the air filter with the high MERV rating is installed is not within the acceptable range. Control then ends. If 770 is true, control progresses to 774, as described below. In some implementations, the airflow of the HVAC system is not used in the evaluation process. In such implementations, elements 768-772 may be omitted and if 764 is true, control progresses directly to 774.

At 774, control determines whether the calculated value of High_Ref_$\Delta$_Temp is within the acceptable range. If 774 is false, control progresses to 776, as described below. If 774 is true, control transfers to 778. At 778, control causes an indication that an air filter with a MERV 14 rating can be used in the HVAC system to be displayed. The testing device 404 may display the indication on the display 520. Control then ends.

At 776, control causes an indication that the temperature difference of the HVAC system while the air filter with a MERV 14 rating is installed is not acceptable to be displayed. At 780, control calculates a change per filter rating level based on the Base A Temp and the High_Ref_$\Delta$_Temp. For example, the testing device 404 may use the following equation to determine the value of the change per filter rating:

$$\text{change per fitler rating} = \frac{\text{Base\_}\Delta\text{\_Temp} - \text{High\_Ref\_}\Delta\text{\_Temp}}{\text{High\_Grade\_MERV} - \text{Baseline\_MERV}}$$

Baseline_MERV and High_Grade_MERV are the MERV ratings of the baseline filter and the high grade filter, respectively. Control then continues with 782, where control determines the highest suitable MERV rated air filter for the HVAC system based on the determined change per filter rating level. For example, the testing device 404 may use the following equation to set the value of the highest suitable MERV rating:

$$\text{highest suitable } MERV \text{ rating} = 7 + \frac{\text{Base\_}\Delta\text{\_Temp} - \text{Acceptable\_}\Delta\text{\_Temp}}{\text{change per filter rating level}}$$

At 784, the control causes an indication of the highest MERV rated air filter that can be used in the HVAC system to be displayed. Control then ends. If the MERV 14 filter is determined not to be suitable, control may disable the HVAC system temporarily so that a more suitable filter can be installed.

Figure 8A:
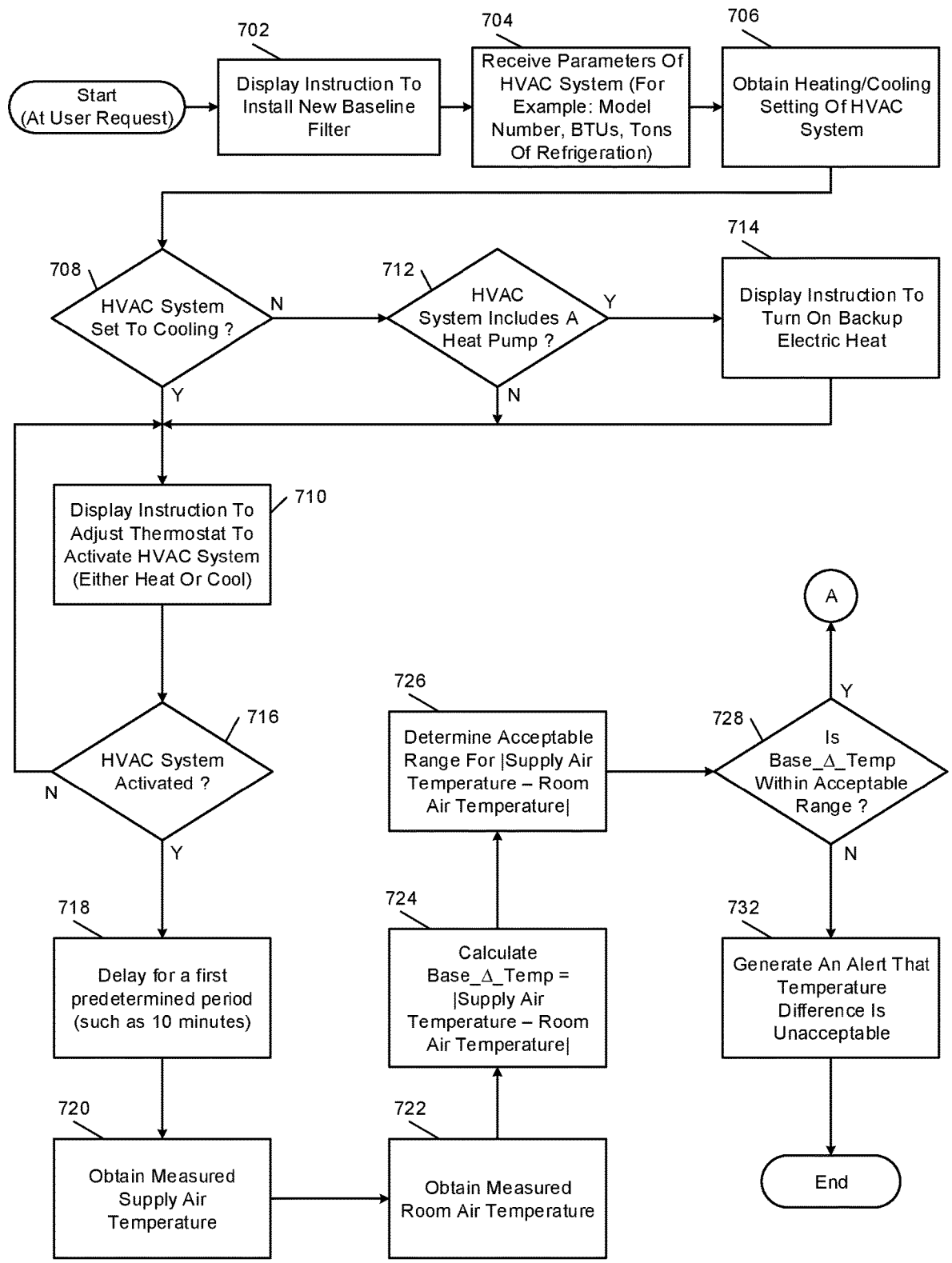
FIGS. 8A and 8B are a flowchart depicting an example method of evaluating the use of different grade air filters in an HVAC system based on air temperature.
Figure 8B:
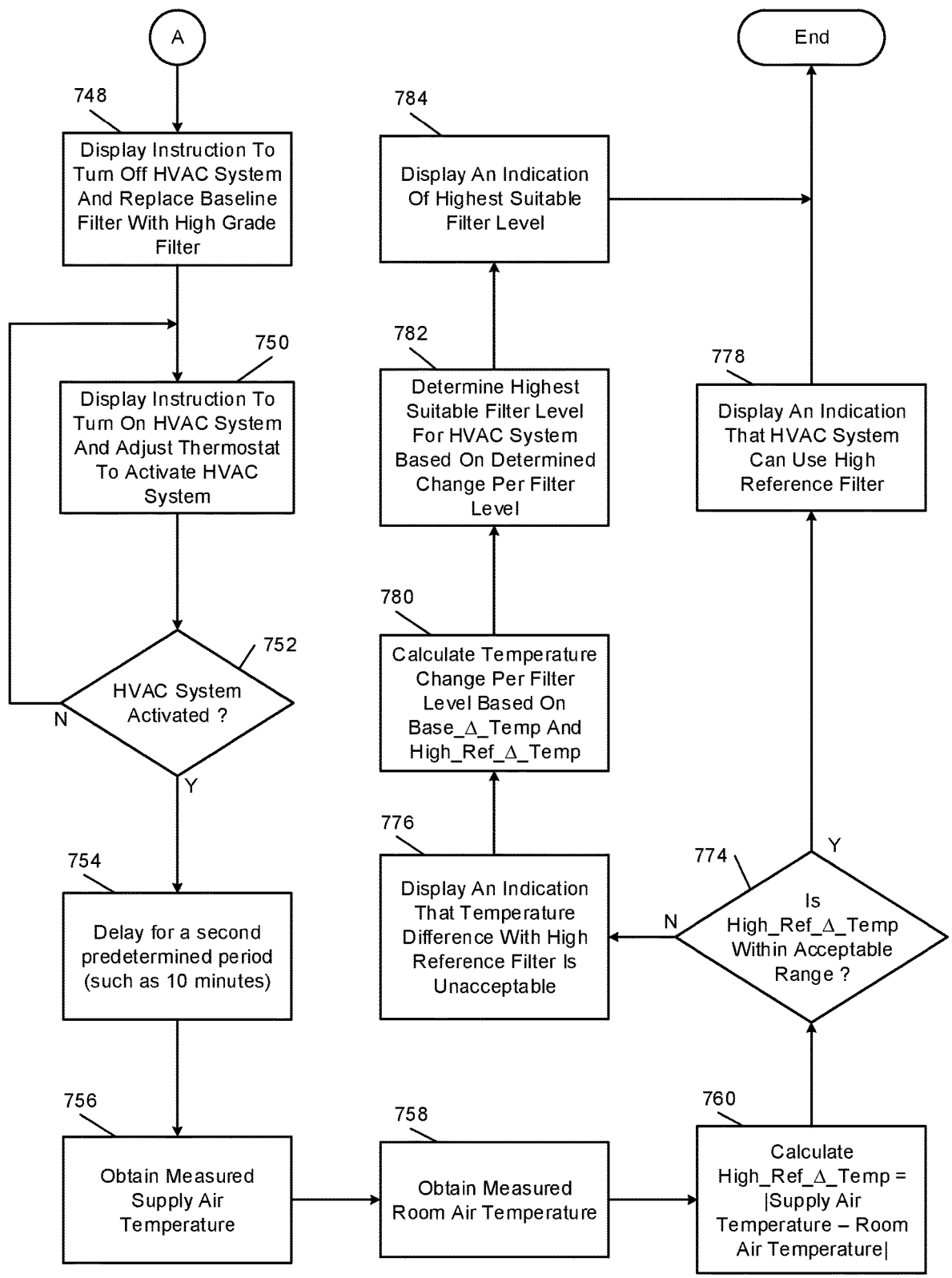

FIGS. 8A-8B are a flowchart depicting an example method for evaluating the use of an air filter with a high MERV rating in an HVAC system using only measured air temperatures. The flowchart illustrated in FIGS. 8A and 8B is the flowchart depicted in FIGS. 7A-7C with the elements related to the current through the motor of the circulator blower 108 and the airflow of the HVAC system omitted.

In some implementations, control ends after 778. In other implementations, after 778, control delays for a predetermined usage period—for example, 1 month, 3 months, 6 months, 9 months, or 12 months—and then re-evaluates the HVAC system with respect to the air filter with the high MERV rating.

In other words, after the air filter with the high MERV rating has been installed in the HVAC system for the usage period, control may again perform elements 750-760 and 774-784 to evaluate the performance of the HVAC system. If control determines that after the predetermined usage period, the temperature difference is not within the acceptable range, control may use particulate matter levels collected by at least one IAQ sensor to determine an average particulate matter level for the usage period. Control then compares the average particulate matter level for the usage period to a predetermined standard particulate matter level. If the average particulate matter level is greater than the standard particulate matter level, control may generate an alert that indicates the filter may be full and suggests replacing the installed filter with a new air filter that has the same MERV rating as the installed air filter.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are non-volatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A heating, ventilation, and air conditioning (HVAC) control system comprising:
   a processor; and
   a computer-readable medium that includes instructions executable by the processor, wherein the instructions include:
   selectively generating a replacement request for an operator to replace a first air filter installed in an air handler of an HVAC system with a second air filter, wherein (i) the first air filter has a first particulate matter removal efficiency rating and (ii) the second air filter has a second particulate matter removal efficiency rating that is greater than the first particulate matter removal efficiency rating,
   in response to activation of the HVAC system following installation of the second air filter, delaying for a first predetermined period of time and then obtaining (i) a first temperature that represents a temperature of air downstream of the air handler and (ii) a second temperature that represents a temperature of air upstream of the air handler,
   calculating a first temperature difference between the first temperature and the second temperature,
   determining whether the first temperature difference is within an acceptable range,
   in response to the first temperature difference being within the acceptable range, (i) operating the HVAC system using the second air filter and (ii) generating an alert indicating compatibility of the second air filter with the HVAC system, and
   in response to determining that the first temperature difference is outside of the acceptable range, disabling operation of the HVAC system pending replacement of the second air filter.

2. The HVAC control system of claim 1 wherein the instructions include:
   while the first air filter is installed, delaying for a second predetermined period of time following HVAC activation and then obtaining (i) a third temperature that represents a temperature of air downstream of the air handler and (ii) a fourth temperature that represents a temperature of air upstream of the air handler,
   calculating a second temperature difference between the third temperature and the fourth temperature,
   determining whether the second temperature difference is within the acceptable range, and
   in response to determining that the second temperature difference is outside of the acceptable range, preventing generation of the replacement request.

3. The HVAC control system of claim 2 wherein the instructions further include selecting between and performing one of:
   designating an existing air filter installed in the HVAC system as the first air filter; and
   generating an initial request to replace the existing air filter with the first air filter.

4. The HVAC control system of claim 2 wherein the instructions further include:
   while the first air filter is installed, obtaining a first current value indicating current consumed by a circulator blower of the HVAC system;
   determining a threshold based on the first current value;
   in response to activation of the HVAC system following installation of the second air filter, obtaining a second current value indicating current consumed by the circulator blower; and
   in response to the second current value being greater than the threshold, generating an alert indicating incompatibility of the second air filter with the HVAC system.

5. The HVAC control system of claim 1 wherein the instructions further include:
   in response to activation of the HVAC system following installation of the second air filter, obtaining a current value indicating current consumed by a circulator blower of the HVAC system; and
   in response to the current value being greater than a threshold, generating an alert indicating incompatibility of the second air filter with the HVAC system.

6. The HVAC control system of claim 1 wherein the instructions further include:
   determining an acceptable range of airflow for the HVAC system;
   in response to activation of the HVAC system following installation of the second air filter, obtaining an airflow value indicating airflow through ductwork of the HVAC system; and
   in response to the airflow value being outside of the acceptable range of airflow, generating an alert indicating incompatibility of the second air filter with the HVAC system.

7. The HVAC control system of claim 1 wherein the instructions further include, in response to determining that the first temperature difference is outside of the acceptable range:
   calculating a change per rating based on the first particulate matter removal efficiency rating, the second particulate matter removal efficiency rating, and the first temperature difference;
   determining a highest suitable particulate matter removal efficiency rating for the HVAC system based on the change per rating; and
   generating an indication of the highest suitable particulate matter removal efficiency rating for the HVAC system.

8. The HVAC control system of claim 1 comprising a first sensor module located at a supply vent of the HVAC system, wherein the first sensor module is configured to measure the first temperature.

9. The HVAC control system of claim 1 wherein the second temperature is obtained from one of a thermostat, a second sensor module located at a return vent of the HVAC system, and a third sensor module located within a conditioned space of the HVAC system, wherein the third sensor module is configured to measure the second temperature.

10. The HVAC control system of claim 1 wherein the instructions further include, in response to installation of the second air filter, generating a request for the operator to activate the HVAC system.

11. The HVAC control system of claim 10 wherein the instructions further include, in response to installation of the second air filter:
- determining whether the HVAC system is set to a heating mode; and
- in response to the HVAC system including a heat pump and being set to the heating mode, generating a request for the operator to activate backup electric heat.

12. The HVAC control system of claim 1 wherein the first particulate matter removal efficiency rating and the second particulate matter removal efficiency rating are minimum efficiency reporting value (MERV) ratings.

13. The HVAC control system of claim 1 where the instructions further include, in response to the first temperature difference being within the acceptable range:
- delaying for a predetermined usage period and then obtaining (i) a third temperature that represents a temperature of air downstream of the air handler and (ii) a fourth temperature that represents a temperature of air upstream of the air handler,
- calculating a second temperature difference between the third temperature and the fourth temperature,
- determining whether the second temperature difference is within the acceptable range, and
- in response to the second temperature difference being within the acceptable range, continue operating the HVAC system using the second air filter.

14. A method for controlling a heating, ventilation, and air conditioning (HVAC) control system, the method comprising:
- selectively generating a replacement request for an operator to replace a first air filter installed in an air handler of an HVAC system with a second air filter, wherein (i) the first air filter has a first particulate matter removal efficiency rating and (ii) the second air filter has a second particulate matter removal efficiency rating that is greater than the first particulate matter removal efficiency rating,
- in response to activation of the HVAC system following installation of the second air filter, delaying for a first predetermined period of time and then obtaining (i) a first temperature that represents a temperature of air downstream of the air handler and (ii) a second temperature that represents a temperature of air upstream of the air handler,
- calculating a first temperature difference between the first temperature and the second temperature,
- determining whether the first temperature difference is within an acceptable range,
- in response to the first temperature difference being within the acceptable range, (i) operating the HVAC system using the second air filter and (ii) generating an alert indicating compatibility of the second air filter with the HVAC system, and
- in response to determining that the first temperature difference is outside of the acceptable range, disabling operation of the HVAC system pending replacement of the second air filter.

15. The method of claim 14 further comprising:
- while the first air filter is installed, delaying for a second predetermined period of time following HVAC activation and then obtaining (i) a third temperature that represents a temperature of air downstream of the air handler and (ii) a fourth temperature that represents a temperature of air upstream of the air handler,
- calculating a second temperature difference between the third temperature and the fourth temperature,
- determining whether the second temperature difference is within the acceptable range, and
- in response to determining that the second temperature difference is outside of the acceptable range, preventing generation of the replacement request.

16. The method of claim 15 further comprising:
- while the first air filter is installed, obtaining a first current value indicating current consumed by a circulator blower of the HVAC system;
- determining a threshold based on the first current value;
- in response to activation of the HVAC system following installation of the second air filter, obtaining a second current value indicating current consumed by the circulator blower; and
- in response to the second current value being greater than the threshold, generating an alert indicating incompatibility of the second air filter with the HVAC system.

17. The method of claim 14 further comprising:
- in response to activation of the HVAC system following installation of the second air filter, obtaining a current value indicating current consumed by a circulator blower of the HVAC system; and
- in response to the current value being greater than a threshold, generating an alert indicating incompatibility of the second air filter with the HVAC system.

18. The method of claim 14 further comprising:
- determining an acceptable range of airflow for the HVAC system;
- in response to activation of the HVAC system following installation of the second air filter, obtaining an airflow value indicating airflow through ductwork of the HVAC system; and
- in response to the airflow value being outside of the acceptable range of airflow, generating an alert indicating incompatibility of the second air filter with the HVAC system.

19. The method of claim 14 further comprising, in response to determining that the first temperature difference is outside of the acceptable range:
- calculating a change per rating based on the first particulate matter removal efficiency rating, the second particulate matter removal efficiency rating, and the first temperature difference;
- determining a highest suitable particulate matter removal efficiency rating for the HVAC system based on the change per rating; and
- generating an indication of the highest suitable particulate matter removal efficiency rating for the HVAC system.

* * * * *